(12) United States Patent
Whitfield

(10) Patent No.: US 11,941,465 B2
(45) Date of Patent: Mar. 26, 2024

(54) FILE DISCOVERY ON A DATA STORAGE DEVICE BASED ON A FILESYSTEM LOCATION OF MICROSERVICES

(71) Applicant: Michael G. Whitfield, Denver, CO (US)

(72) Inventor: Michael G. Whitfield, Denver, CO (US)

( * ) Notice: Subject to any disclaimer, the term of this patent is extended or adjusted under 35 U.S.C. 154(b) by 0 days.

(21) Appl. No.: 17/733,672

(22) Filed: Apr. 29, 2022

(65) Prior Publication Data
US 2023/0273845 A1    Aug. 31, 2023

Related U.S. Application Data

(60) Provisional application No. 63/181,778, filed on Apr. 29, 2021.

(51) Int. Cl.
| | | |
|---|---|---|
| G06F 15/16 | (2006.01) | |
| G06F 8/70 | (2018.01) | |
| G06F 9/54 | (2006.01) | |
| G06F 16/14 | (2019.01) | |

(52) U.S. Cl.
CPC .............. G06F 9/547 (2013.01); G06F 8/70 (2013.01); G06F 16/148 (2019.01)

(58) Field of Classification Search
CPC .......... G06F 9/547; G06F 8/70; G06F 16/148
See application file for complete search history.

(56) References Cited

U.S. PATENT DOCUMENTS

| | | | |
|---|---|---|---|
| 10,037,339 B1* | 7/2018 | Kleinpeter | G06F 16/125 |
| 10,585,802 B1* | 3/2020 | Singh | G06F 16/172 |
| 2011/0137973 A1* | 6/2011 | Wei | H04L 67/1001 |
| | | | 709/202 |
| 2018/0060065 A1* | 3/2018 | Lai | G06F 8/71 |
| 2018/0081661 A1* | 3/2018 | Gonzalez del Solar | G06F 8/61 |
| 2018/0121562 A1* | 5/2018 | Watkins | G06F 16/80 |
| 2020/0259884 A1* | 8/2020 | Schmidt | H04L 67/306 |
| 2022/0075870 A1* | 3/2022 | Kortney | G06F 21/6218 |
| 2022/0174096 A1* | 6/2022 | Schmitt | H04L 63/062 |
| 2022/0179939 A1* | 6/2022 | Drepper | G06F 21/629 |
| 2022/0308925 A1* | 9/2022 | Shilane | G06F 16/134 |

* cited by examiner

*Primary Examiner* — Normin Abedin
(74) *Attorney, Agent, or Firm* — The Rapacke Law Group, P.A.; Andrew S. Rapacke

(57) ABSTRACT

The present disclosure describes creating a cache of discovered directories in a filesystem stored on a data storage device wherein said cache of discovered directories describe packages that are semantically constructed as microservices, among numerous other aspects.

9 Claims, 22 Drawing Sheets

| Package object cache | Development Environment | Production Environment |
|---|---|---|
| Local package cache | When a local microservice package file's modification time exceeds the modification time of the cache file | Refreshed only on installation of the microservice associated with the root path or if the cache does not already exist |
| Package manager managed build-time object cache | Refreshed on each run of the application | Refreshed only on installation of the microservice associated with the root path or if the cache does not already exist |
| Package manager managed load-time object cache | Refreshed only on installation of the microservice associated with the root path or if the cache does not already exist | Refreshed only on installation of the microservice associated with the root path or if the cache does not already exist |
| Package manager managed run-time cache | Refreshed only on installation of the microservice associated with the root path or if the cache does not already exist | Refreshed only on installation of the microservice associated with the root path or if the cache does not already exist |

FILE DISCOVERY ON A DATA STORAGE DEVICE BASED ON A FILESYSTEM LOCATION OF MICROSERVICES

CROSS-REFERENCE TO RELATED APPLICATIONS

The present application claims priority to U.S. Provisional Application No. 63/181,778 filed Apr. 29, 2021, titled "FILE DISCOVERY ON A DATA STORAGE DEVICE BASED ON A FILESYSTEM LOCATION OF MICROSERVICES," which is hereby incorporated by reference in its entirety

BACKGROUND

Software application and server software development has shifted from monolithic architectures to microservice architectures. Monolithic architectures implement numerous quality control mechanisms and compliances spanning areas such as (but not limited to) automated code testing, code style compliance, security compliance, reporting compliance, resource monitoring. Microservice architectures enable software teams to create business value without requiring end-to-end integration with the rest of the business. Microservice architectures allow software teams to deliver the business value proposition first, without requiring costly integration with the monolith. Once a microservice has proven a business value, it should be integrated with other microservices and monoliths in order to provide greater functionality and usage (across the organization).

Development of microservice architectures and later integration presents different and complex challenges for businesses, as opposed to monolithic architecture development. Useful tools are required to reduce the number of keystrokes a developer must perform in order to bring a system of microservices "up" or "online" without introducing new or additional complexity and cost. In other words, the agility offered by initial microservice development should not be negatively affected by the costs of later integrating microservices with one another or with monoliths. Furthermore, useful tools should facilitate the creation of ad hoc structures between microservices without enforcing particular structures on the microservices developed. This is in contrast with requirements posed at the outset of monolithic architectures. A useful tool should offer flexibility when integrating a microservice. In other words, once the decision is made to integrate one microservice with another microservice or with a monolith service, the decision should not reintroduce the same costs that would have been present in developing a monolithic architecture all-at-once. A reduced or delayed cost is highly beneficial for business operations.

Kubernetes, also known as k8s, is an open source orchestration system for automating deployment, scaling, and management of containerized applications. Docker Swarm is another similar technology (see https://docs.docker.com/get-started/orchestration/). In addition to facilitating deployment, these technologies help orchestrate functionality between [micro]services using the networking layer for service to service communication (see https://docs.docker.com/network/ and https://www.tutorialworks.com/container-networking/). Since technologies like Kubernetes and Docker Swarm rely on using the network for service to service communication, this allows technology professionals to separate the problems of application development from the deployment of the application, and these problems are often worked on by separate professional roles. This separation of roles often means [application] development engineers and [application] deployment engineers operate separate technologies (with the latter role operating technologies like Kubernetes and Docker Swarm), and there is a resulting cost incurred by application engineers and deployment engineers in communicating, modifying or debugging application configurations required to deploy those applications. In addition, the choices made by technologies like Kubernetes and Docker Swarm to solve the orchestration problems inhibit agility during the application development and application deployment cycle. This is because application developers must either learn complex orchestration technologies like Kubernetes and Docker Swarm and run applications using these technologies during development or they must defer orchestration configuration until after the application has been mostly developed and rely on communicating with deployment engineers. Furthermore, there are design constraints placed upon microservices to communicate over the network which reduces the choice application developers have in structuring or restructuring the functionality of microservices (further reducing agility). While containerization technologies like Docker offer filesystem mounts and volumes so that microservices can communicate via the local filesystem, there is no other facilitation besides this for assisting with service to service communication.

NPM Workspaces, [Facebook] Yarn Workspaces and Lerna are another class of technologies that offer some flexibility for application developers when structuring their applications into [micro]services. These technologies offer tools for simplifying how dependencies are installed across services. They offer additional support for service versioning, and ease script execution within service directories. Defining relationships between services is otherwise not facilitated by these technologies, so application engineers incur a cost any time they want to define or redefine relationships between services. There are limitations in the robustness with which these technologies perform service discovery since they rely on user-defined service paths (despite allowing for glob-style wildcards), and this limitedness of robustness may prevent the technologies from offering further functionality to ease the development of microservice ecosystems.

Even with the advent of HTTP2, and certainly before HTTP2, a significant amount of time can be consumed during the life of an HTTP request in creating the network connection needed for the request, in comparison to the actual transfer of data using the connection. As such, frontend framework libraries and tools like Webpack and Rollup go to significant lengths to create data structures that are known as bundles. Bundles consolidate JavaScript and CSS files into a single file. These single file bundles allow all of the JavaScript or CSS files contained therein to be requested with a single HTTP request instead of many HTTP requests, since HTTP requests of frontend JavaScript files and CSS files are typically made to request a single file from a web server. This bundling reduces the time it takes to retrieve JavaScript and CSS files necessary for displaying a website to a user. The bundling process must address the question of "how" it goes about bundling JavaScript and CSS files, in order to determine "what" files to bundle. Modern bundling software, such as Webpack and Rollup, employs a dependency graph that traces dependency files of entry files. Entry files are specified by a developer and dependency files of entry files are determined by the bundling software when a developer makes changes to the software. The analysis of entry files and their dependencies is used to create a dependency graph. Once a dependency graph is created, the bundling software can concatenate the files so that the files depended on are loaded first in the bundle file. This ensures dependent files have the dependencies needed when the dependent files load after the files they depend upon. This process of generating a dependency graph to create a bundle is typically performed after each file change and can significantly slow down the development process (see concerns addressed by FIG. 7). An alternative approach can allow a developer to explicitly specify what files to include in a bundle and omit dependency analysis. This approach is less comprehensive than approaches using dependency analysis and other related techniques (e.g. tree shaking or others), but can still be sufficiently comprehensive for small websites and web applications. Importantly, omitting dependency analysis and other associated analyses eliminates most of the processing time needed to create a bundle for each code change, while preserving speed benefits for HTTP requests by having a bundle file. There are numerous benefits to relying on querying ambiguously known files within discovered microservices and then bundling those files. Arguably, one rationale for devising comprehensive dependency analysis bundling solutions like Webpack and Rollup is that the overall topology of how files are stored is unknown, so exhaustively analyzing all depended on files is necessary. Since web servers typically serve files on a basis of one request, one file, and because of the prioritization techniques of generating query results for discovered microservices (outlined by the prioritization description of FIG. 12), developers can use the described processes and examples to contain their website functionality in semantically meaningful microservices and simply override microservice defaults (see concerns outlined by prioritization description of FIG. 12).

SUMMARY

A microhost program is operable to discover microservices in a root directory in which a user or system initially has imported the microhost program. Once microservices have been discovered, the user or system can query files within those microservices.

Using filesystem queries is useful when a user or system wants to orchestrate functionality between microservices without explicitly coordinating how the microservices are related. This allows the user or system to more easily reorganize microservices as they are developed. This can help eliminate the need for an oversized router file or inclusion of files explicitly en masse.

In some cases, using filesystem queries can also alleviate the need to rely on lexical parsing for analyzing dependencies. While this may not eliminate the gains provided by tools like TypeScript or automated bundling provided by tools like React or Angular, systems and methods provided herein include an alternative way for file orchestration. When starting a project from scratch, companies often need to consider how much time their developers will spend waiting on recompilation every time they save a change. The systems and methods herein can be pre-packaged with a way to develop frontends without requiring recompilation on each change.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 7 illustrates a table comparing different caches for a development environment and a production environment according to some embodiments described herein;

DETAILED DESCRIPTION

Figure 1:
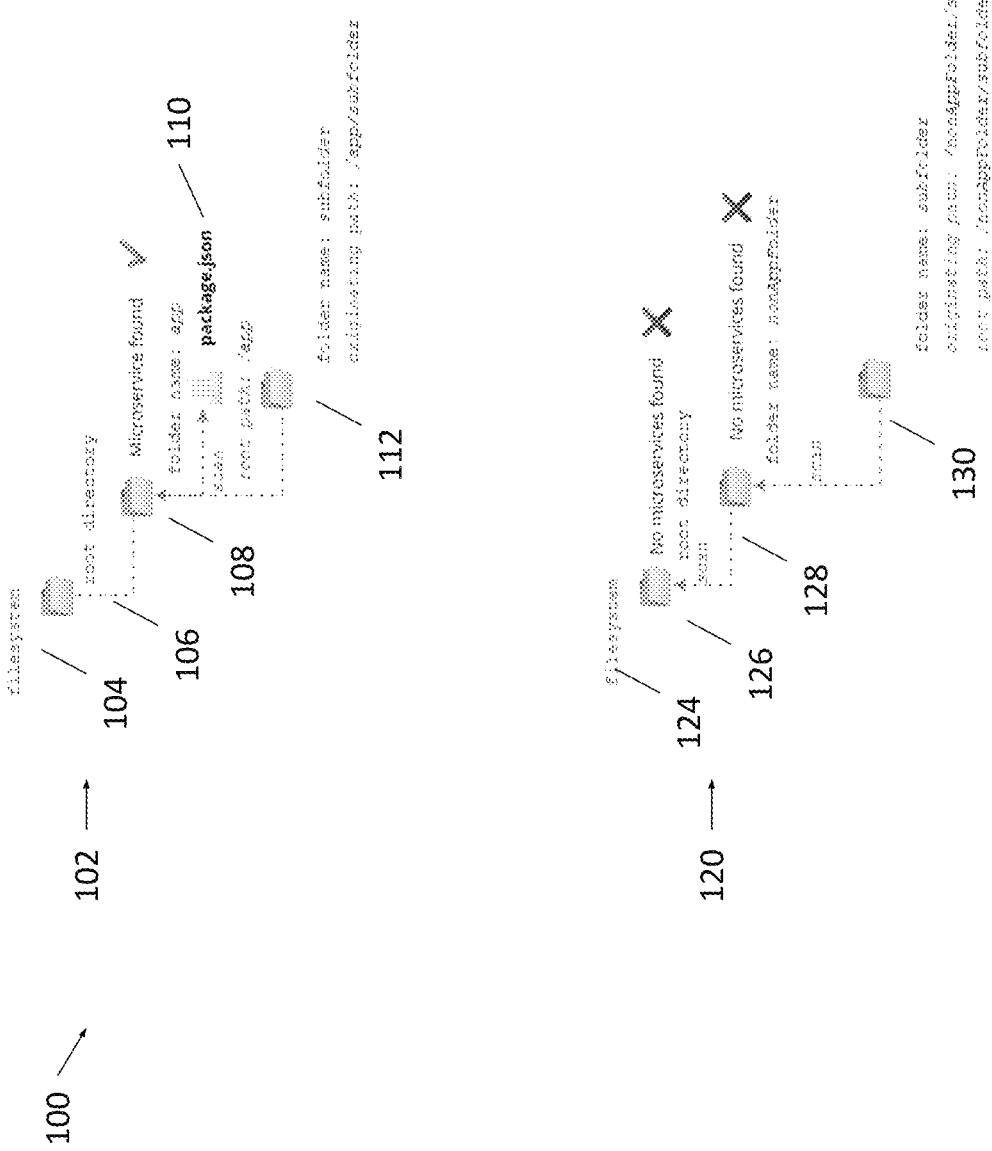
FIG. 1 is a diagram showing an example of a process for discovery of one or more microservice package files according to some embodiments described herein.

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, the term "microservice" refers to an organization of software that reliably provides resources, executes subroutines, handles network requests in a pattern that may be self-contained so that its inner workings and organizations are of less importance than its external interface made available to users, customers, and/or other software (see, for example, https://en.wikipedia.org/wiki/Service-oriented_architecture; https://en.wikipedia.org/wiki/Microservices).

As used herein, the term "root path" refers to a first path in a directory tree in which a microservice discovery process is initiated containing a microservice definition file, and/or the path in which the microservice discovery process is initiated if no microservice definition file exists in the directory tree of the path.

As used herein, the term "microservice directory" refers to a directory in the filesystem containing a microservice definition file.

As used herein, the term "microservice definition file" refers to a structured file containing the name of a microservice and may include its version, dependencies, author information and other meta information distinguishing it from other microservices.

As used herein, the term "lookup directory of microservices" refers to a structured file for a given root path associating names of microservices with their corresponding filesystem paths within that root path.

As used herein, the term "global lookup directory of microservices" refers to a set of lookup directories of microservices such that all lookup directories of microservices for their corresponding root paths are retrievable from one location.

As used herein, the term "microservice location cache" refers to a structured file containing filesystem path(s) of microservices with their corresponding names.

As used herein, the term "microservice object cache" refers to a structured file containing microservice definition files for a corresponding microservice definition file path.

As used herein, the term "microservice package manager-managed location cache" refers to a structured file similar to the microservice location cache. However, it may store only microservices that are managed by a package manager.

As used herein, the term "microservice package manager-managed object cache" refers to a structured file similar to the microservice object cache. However, it may store only microservices that are managed by a package manager.

As used herein, the term "contained microservices of a microservice cache" refers to a collection of microservice location cache, microservice object cache, microservice package-manager managed object cache, and/or package manager-managed location cache for a given root path.

The present disclosure describes a variety of systems and methods for performing file discovery on a data storage device based on a filesystem location of microservices. A microservice first can be discovered based on and defined by the existence of a package management file (e.g. package.json for Node.js or pom.xml for Maven-managed Java). The filesystem can be crawled on the data storage device, given a current working directory as a root path. If a microservice exists in a crawled directory relative to the root path, the microservice directory can be saved in a non-transitory computer readable memory. Since some microservices exist in directories that are managed by a package manager (e.g. NPM for Node.js or Maven for Java), filesystem locations containing microservices can be treated and/or managed differently based upon whether they are managed via a package manager. A directory of filesystem paths of microservices can be constructed, which represents a lookup directory of microservices that includes all microservice directories given a root path. After a filesystem crawl, the lookup directory of microservices can be stored in a file in non-transitory memory on a data storage device in a root path. Additionally, a lookup directory of microservices given the root path can be merged into a global lookup directory of microservices including specified or all filesystem crawls made across specified or all root paths on the data storage device. These same patterns can extend to networked computers' filesystems, as well. Either the file containing the lookup directory of microservices or the file containing the global lookup directory of microservices can be referred to as a microservice location cache. The microservice location cache can provide improved lookup efficiency. A computer program, executed by at least one processor, can use the microservice location cache to efficiently perform filesystem queries using each microservice directory as a root path. An efficient lookup allows the system to create, develop, or construct queries as to the contents of microservices that may allow human or machine implemented software application developers to define consistent filesystem structures across microservices without needing to know which files each microservice contains.

Referring to FIG. 1, a diagram 100 illustrates a microservice discovery process, according to an example embodiment. In the example depicted in FIG. 1, an originating path can be a directory that originated a microservice discovery process on a runtime processor. A system can attempt to discover a microservice package file, which can be found via an originating path directory tree by checking a next top-level directory until a root directory is reached. As shown by tree 102, if a microservice package file is found, this path can become or be assigned as a root path for that microservice package file. As shown by tree 120, if a microservice package file is not found, an originating path can be set as the root path. A microservice directory can be discovered for the originating path by locating a directory in an originating path containing a microservice definition file. If an originating path does not contain a microservice definition file, then a directory parenting the originating path can be checked. This process can be repeated until a microservice definition file is found. If a microservice definition file is found within an originating path file tree, then the root path can be a first directory checked via this process with a microservice definition file in the originating path file tree. If no microservice definition file is found in the originating path directory tree, then the originating path becomes the root path.

A search of filesystem 104 can include a root directory scan 106. If a microservice is found in 108, a folder name: folder app can be scanned to find a package.json 110. Root path: /app can be set with folder name: subfolder, originating path: /app/subfolder 112.

Alternatively, a search of filesystem 124 can include a root directory scan 126 where no microservices are found. A subsequent scan may also show no microservice is found in 128, a folder name: noAppFolder may exist with no package.json and a scan in 124 can result in folder name 130: subfolder, originating path: /nonAppFolder/subfolder and root path: /nonAppFolder/subfolder.

Figure 2:
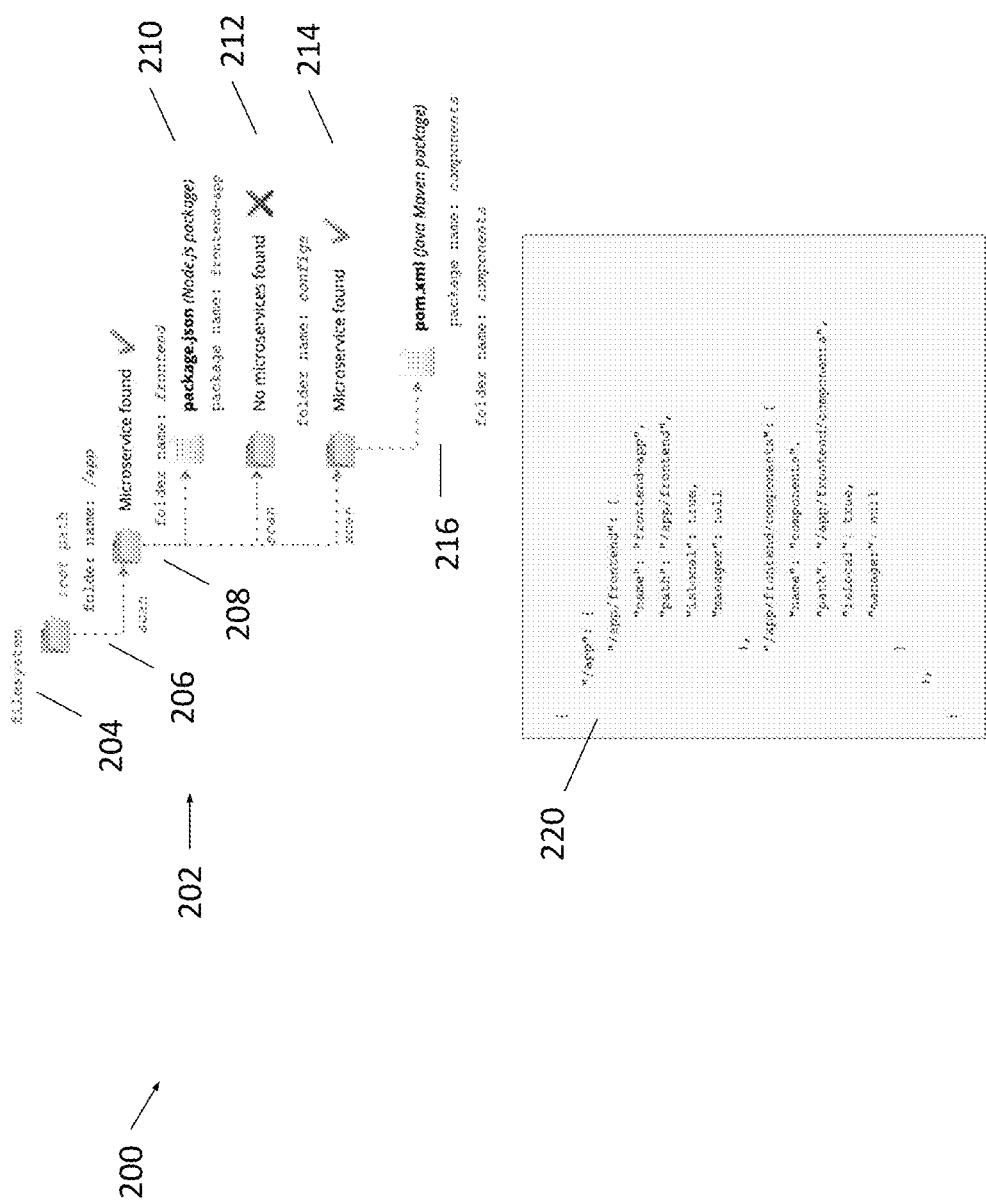
FIG. 2 is a diagram showing an example of a process for discovery of one or more microservice package files according to some embodiments described herein.

Referring to FIG. 2, a diagram 200 illustrates a microservice discovery process, according to an example embodiment. Scanning for microservice package files from a root path and storing the name of a microservice associated with the discovered path(s) is shown. In the example depicted in FIG. 2, tree 202 shows that a root path where a runtime processor is running which can correspond to a current working directory, and the current working directory can be scanned for all files and directories. For each directory scanned, the directory can be set as a new current working directory. If the new current working directory contains a microservice, the name of the microservice can be stored and associated with the current working directory in memory. The system can determine that a directory has a microservice if the directory contains a file that is associated with package management software that defines package dependencies and a package name. For example, this package management software could be Facebook Yarn Workspaces, Lerna, NPM Workspaces by npm, Inc., Yarn software, pip software (package installer for Python), or the Apache Software Foundation's Maven software, or others. This file that is associated with package management software that defines package dependencies and a package name can be the microservice definition file. The name of the microservice can be retrieved, gathered or gleaned when the system reads the microservice definition file and parses the file contents associated file format, which could be JSON, XML, or another structured file format. This process can be repeated until no new directories are found on the file scan in the current working directory or the search for new directories is exhausted. The resulting mapping of package names with directories can be stored in non-transitory computer readable memory, for example in a database, file or other structure. Additionally, resulting content for file reads of microservice definition files can be stored in non-transitory computer readable memory. These two mappings can be known as a microservice location cache and a microservice object cache, respectively.

A search of filesystem 204 can include a root path directory scan 206 with folder name: /app. If a microservice is found in 208, a folder name: app/frontend can be scanned to find a app/frontend/package.json (Node.js package) with package name: frontend-app 210. Scan 212 may indicate no microservices found with folder name: app/configs. A scan with microservice found 214 can result in app/components/pom.xml (e.g. Java Maven package) package name: components, folder name: components 216.

As shown, code 220 for memory can be used to implement such processes, as follows:

```
{
    "frontend-app:: {
        "path": "/app/frontend/",
        "isLocal": true,
        "manager": null
    },
    "components": {
        "path": "/app/frontend/components/",
        "isLocal": true,
        "manager": null
    }
}
```

Figure 3:
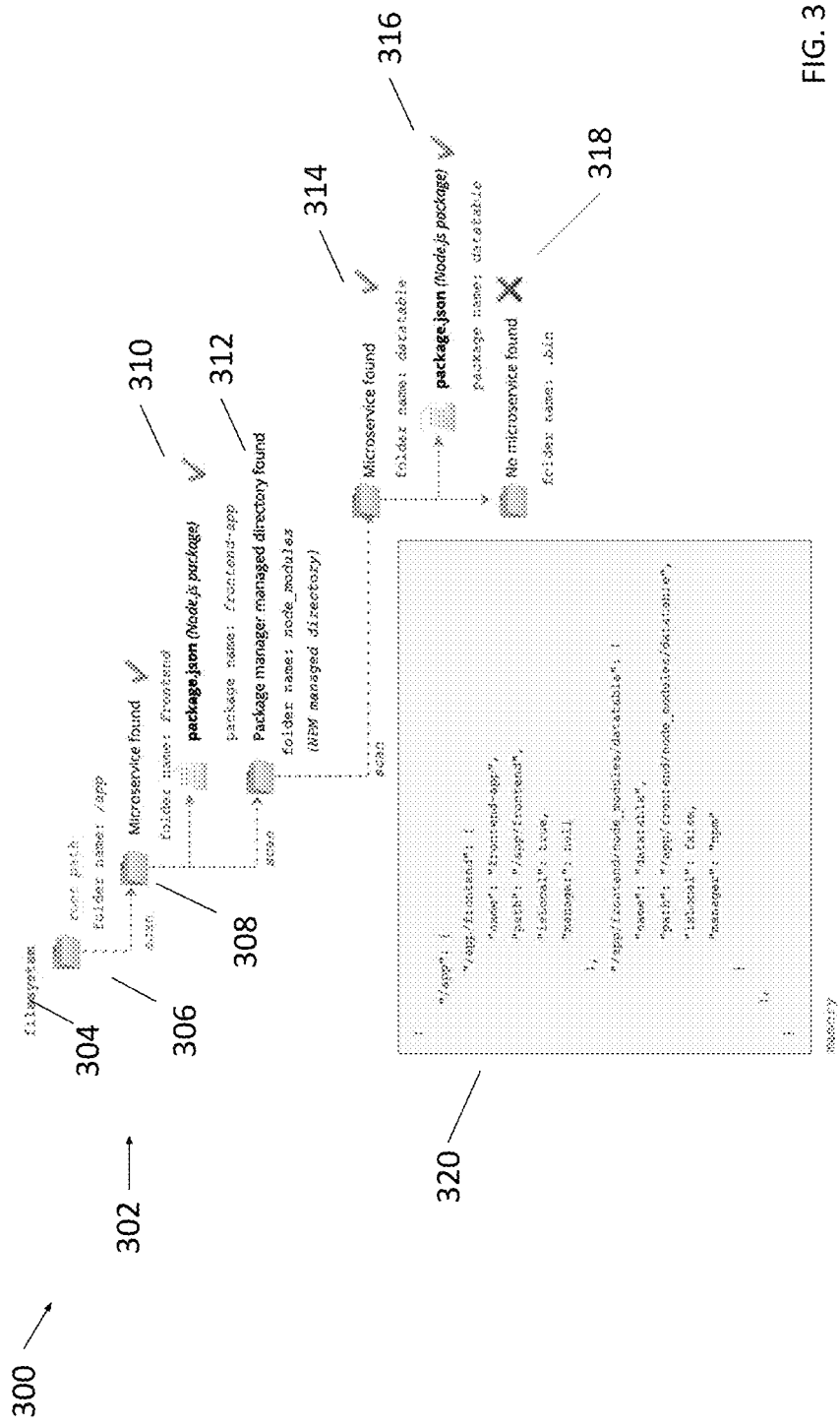
FIG. 3 is a diagram showing an example of a process for marking one or more microservice package files according to some embodiments described herein.

Referring to FIG. 3, a diagram 300 illustrates a microservice discovery process, according to an example embodiment. Packages found in a package manager managed directories are marked as being managed by that package manager. In the example depicted in FIG. 3, tree 302 illustrates an example of how a directory with a name associated with a package manager can be found during a file scan in a current working directory. That is, the directory can be managed by a package manager. In this example, any subsequent microservices discovered in that directory are marked as managed by that package manager. For example, a package manager managed directory for NPM or Yarn can be any directory with a path parented by a node_modules directory.

A search of filesystem 304 can include a root path scan 306 with folder name: /app. If a microservice is found in 308, a folder name: app/frontend can result in the discovery of the microservice definition file, package.json (Node.js package) with package name: frontend-app 310. Scan 312 may indicate package manager managed directory found with folder name: app/frontend/node_modules (NPM managed directory). A scan with microservice found 314 can result in folder name: app/frontend/node_modules/datatable and package.json (Node.js package) with package name: datatable 316. A scan may result in no microservice being found in 318, folder name: app/frontend/node_modules/.bin.

As shown, code 320 for memory can be used to implement such processes, as follows:

```
{
    "frontend-app:: {
        "path": "/app/frontend",
        "isLocal": true,
        "manager": null
    },
    "datatable": {
        "path": "/app/frontend/node_modules/datatable",
        "isLocal": false,
        "manager": npm
    }
}
```

Figure 4:
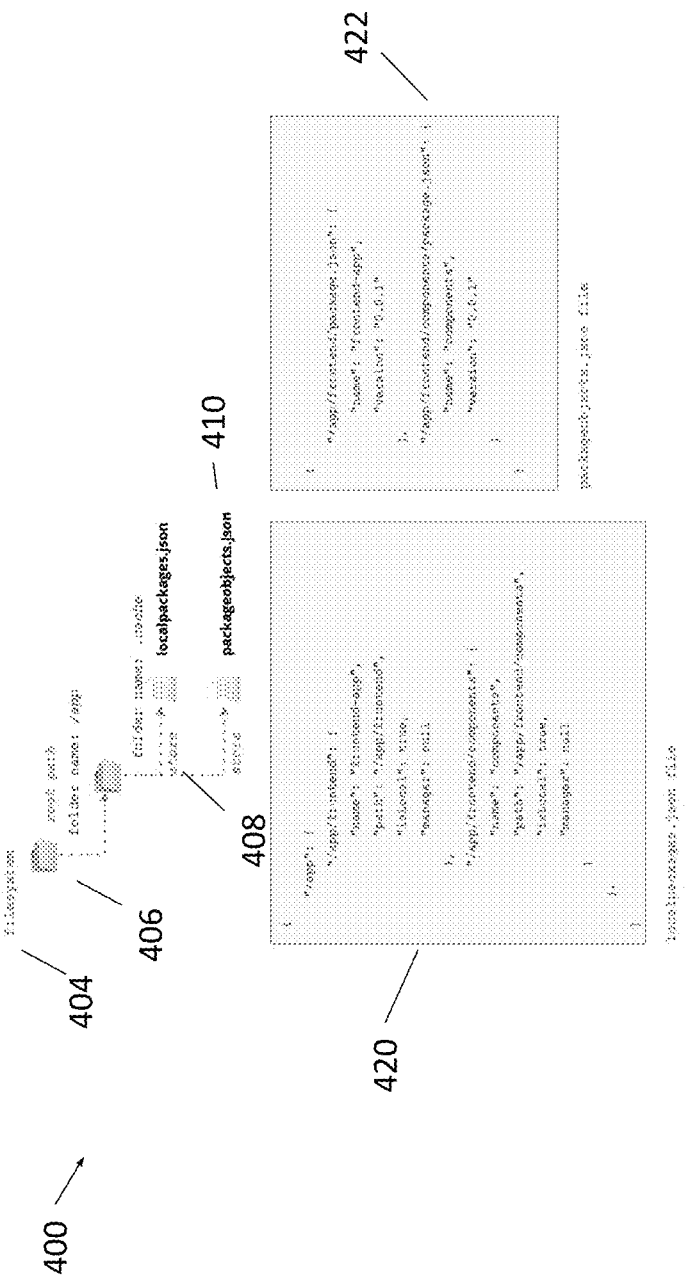
FIG. 4 is a diagram showing an example of a process for storing microservice discovery information according to some embodiments described herein.

Referring to FIG. 4, a diagram 400 illustrates a microservice discovery process, according to an example embodiment. Results of a filesystem crawl operation are stored in cache files. These cache files can store the package name and its path and the contents of the package file. Both the filesystem crawl and the reading of the package file can be time consuming operations, assuming the package file even exists to be read. FIG. 4 illustrates that once a microservice location cache and a microservice object cache have been created by scanning the filesystem and entries have been marked if they are associated with a package manager, then the resulting caches are written to a .cache folder in the root path 408. In the example depicted in FIG. 4, the two files <root path>/.cache/localpackages.json and <root path>/.cache/packageobjects.json are written. Microservices in directories managed by package managers are not written to these cache files but other, separate cache files mostly as a matter of convention and not necessity. The format of the resulting caches is described in a JSON format that readily makes available all microservice locations for a given root path. Alternative embodiments exist where it is possible to store these cache results in a database with the only requirement being to shortcut the processing time required by implementing or executing a filesystem scan. This shortcut of the processing time for a filesystem scan can be achieved by storing the results of a filesystem scan into a cache or cache-like storage device, e.g. a database, such that reading the cache costs far fewer resources than performing another filesystem scan and where the likelihood of filesystem changes is diminutive given a particular set of contexts described herein. That is, in a cache, a hashmap structure allows a directory to be referenced that may otherwise reference the current working directory to initiate a microservice discovery process to obtain the list of microservice directories discovered for that root path for the microservice location cache, and a hashmap structure allows a package object to be obtained given a file path of the file associated with a package manager defining a microservice for the microservice object cache.

A search of filesystem 404 can include a root path 406 with folder name: /app. folder name: .cache can store localpackages.json 408 and packageobjects.json 410.

As shown, code 420 for localpackages.json file can be used to implement such processes, as follows:

```
{
  "/app": {
    "/app/frontend: {
      "name': "frontend-app",
      "path": "/app/frontend/",
      "isLocal": true,
      "manager": null
    },
    "/app/frontend/components": {
      "name': "components",
      "path": "/app/frontend/components/",
      "isLocal": true,
      "manager": null
    }
  }
}
```

As shown, code 422 for packageobjects.json file can be used to implement such processes, as follows:

```
{
  "/app/frontend/package.json": {
    "name": "frontend-app",
    "version": "0.0.1"
  },
```

```
  "/app/frontend/components/package.json": {
    "name": "components",
    "version": "0.0.1"
  }
}
```

Figure 5:
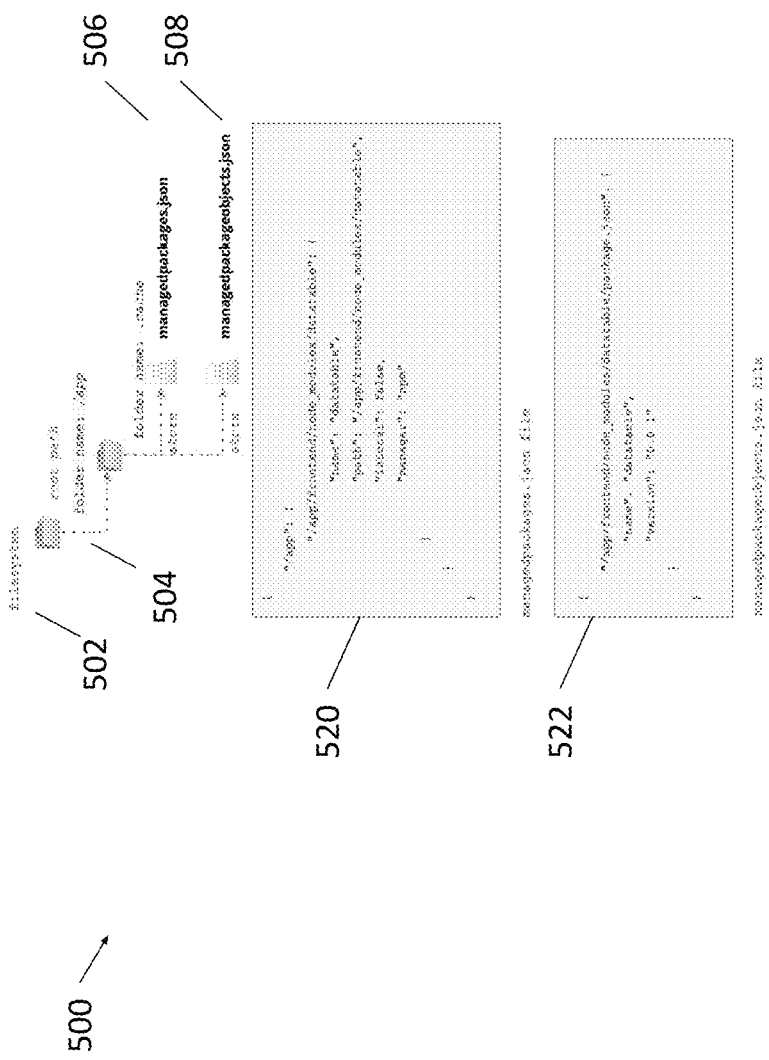
FIG. 5 is a diagram showing an example of a process for storing microservice discovery information according to some embodiments described herein.

Referring to FIG. 5, a diagram 500 illustrates a microservice discovery process, according to an example embodiment. Packages that are discovered by a filesystem crawl that are managed by a package manager are stored in other, separate cache files mostly as a matter of convention and not necessity. These cache files can store the package name and its path and the contents of the package file. Both the filesystem crawl and the reading of the package file can be time consuming operations, assuming the package file even exists to be read. FIG. 5 illustrates that microservices in directories managed by package managers are marked during the discovery of microservice directories in the filesystem on a data device. For example, any discovered microservice directories inside a node_modules folder for NPM or Yarn are marked. The name of these microservices and their associated directories are not stored in the microservice location cache nor the microservice object cache. Instead, they are stored in a separate microservice package manager-managed location cache and a microservice package manager-managed object cache, respectively. For example, FIG. 5 illustrates an example in which the resulting cache files for this operation are written to <root path>/.cache/managedpackages.json and <root path>/.cache/managedpackageobjects.json, respectively. The format of the resulting caches is described in a JSON format that is shared with the microservice location cache and microservice object cache. That is, the microservice package manager-managed location cache format is identical to the microservice location cache and the microservice package manager-managed object cache format is identical to the microservice object cache.

A search of filesystem 502 can include a root path 504 with folder name: /app. folder name: app/.cache can store managedpackages.json 506 and managedpackageobjects.json 508.

As shown, code 520 for managedpackages.json file can be used to implement such processes, as follows:

```
{
  "/app": {
    "/app/frontend/node_modules/datatable": {
      "path": "/app/frontend/node_modules/datatable",
      "name": "datatable",
      "isLocal": false,
      "manager": "npm"
    }
  }
}
```

As shown, code 522 for managedpackageobjects.json file can be used to implement such processes, as follows:

```
{
  "/app/frontend/node_modules/datatable/package.json": {
    "name": "datatable",
    "version": "0.0.1"
  }
}
```

Figure 6:
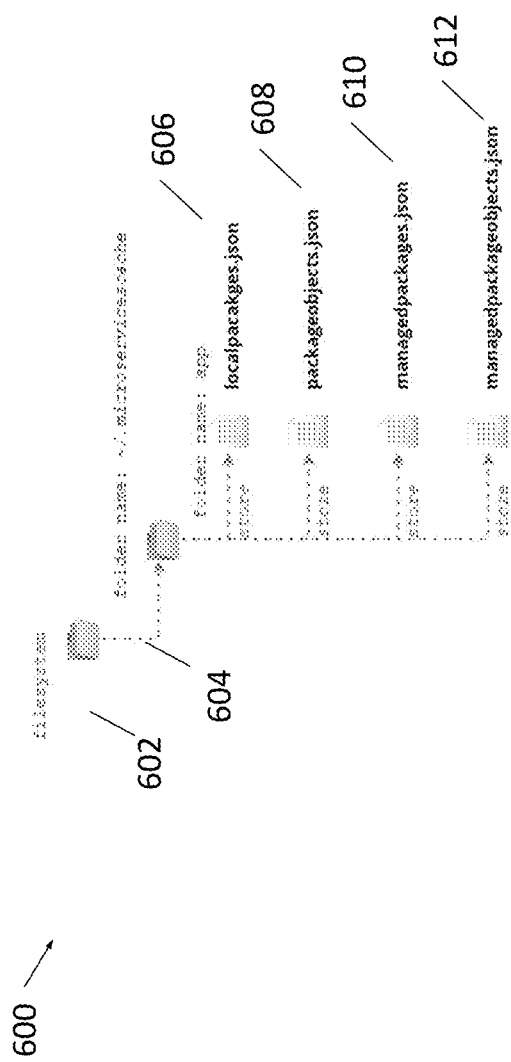
FIG. 6 is a diagram showing an example of a process for storing microservice discovery information according to some embodiments described herein.

Referring to FIG. 6, a diagram 600 illustrates a microservice discovery process, according to an example embodiment. For microservice discoveries that are performed on root paths where a microservice is defined, the contained microservices of a microservice cache for that microservice are stored in a filesystem location that is fixed and known. For example, this could be ~/.microservicescache. By using a fixed and known path to store the contained microservices of a microservice cache, other microservices are then able to reliably look up the cache to circumvent the repetition of the microservice discovery process and to obtain the microservices contained within a file path. FIG. 6 illustrates that, for microservice discoveries performed on root paths where a microservice is defined, the contained microservices of a microservice cache for that microservice is stored in a filesystem location that is fixed and known (e.g., ~/.microservicecache) such that other services are able to reliably look up the microservices contained within a file path. FIG. 6 illustrates an example in which multiple caches of discovered microservices for root paths are stored and collectively known as the contained microservices of a microservice cache. In FIG. 6, the contained microservices include: a microservice location cache; a microservice object cache; a microservice package manager-managed location cache; and a microservice package manager-managed object cache. FIG. 6 further illustrates that these caches are stored in the ~/.microservicecache folder. If a microservice discovery process occurring on a root path contains a microservice definition file, the resulting microservice package manager-managed location cache, microservice package manager-managed object cache, microservice location cache and microservice object cache are stored in a single location on the filesystem hosted on a data device. For example, the single location may be in an operating system's user directory (denoted by the ~ character) ~/.microservices/<serialized-package-path>/[cache files], where serialized-package-path identifies the path of the root path and the [cache files] are the contained microservices of a microservice cache. Therefore, given each microservice discovered for a root path wherein a runtime processor is instructed to discover contained microservices for the microservice discovered in an originating path, the resulting contained microservices of a microservice cache are stored in a single location on the filesystem hosted on a data device. This is referred to herein as a global microservices cache.

A filesystem 602 can include folder name: ~/.microservicescache folder name: ~/.microservicescache/app can store localpackages.json 606, packageobjects.json 608, managepackages.json 610, and managedpackageobjects.json 612.

Referring to FIG. 7, chart 700 illustrates a microservice discovery process, according to an example embodiment. FIG. 7 illustrates that caching the list of discovered microservices names, their paths, and their associated package objects into hash maps saves significant amounts of processing time that would otherwise be spent traversing filesystem trees. Likewise, consolidating the microservice package files into a single cache file saves significant processing time that would be spent opening operating system file handlers on those files. It is also beneficial that this process is automated, and a developer is not burdened to explicitly specify where microservices exist within the filesystem as they are automatically discovered. However, it is not trivial about when these caches should be refreshed. In particular, the following set of events is treated differently across a development environment versus a production environment, as illustrated in FIG. 7. A development environment regards a cache refresh organization appropriate for when a developer is actively building microservices. The development environment optimizes for speed but accounts for the higher frequency with which a developer may need the caches refreshed without burdening the developer to explicitly make this decision. A production environment regards a cache refresh organization appropriate for when a set of microservices has been finalized. The production environment optimizes for speed.

As shown in FIG. 7, conditions of a package object cache in a development environment can mean that when a local microservice package file's modification time exceeds the modification time of the cache file. A package object cache in a production environment may be refreshed only upon installation of the microservice associated with the root path or if the cache does not already exist. A local packages cache in a development environment may be refreshed on each run of the application. A local packages cache in a production environment may be refreshed only upon installation of the microservice associated with the root path or if the cache does not already exist. A package manager managed package object cache in a development environment may be refreshed only on installation of the microservice associated with the root path or if the cache does not already exist. A package manager managed package object cache in a production environment may be refreshed only on installation of the microservice associated with the root path or if the cache does not already exist. A package manager managed packages cache in a development environment may be refreshed only upon installation of the microservice associated with the root path or if the cache does not already exist. A package manager managed packages cache in a production environment may be refreshed only upon installation of the microservice associated with the root path or if the cache does not already exist.

Figure 8A:
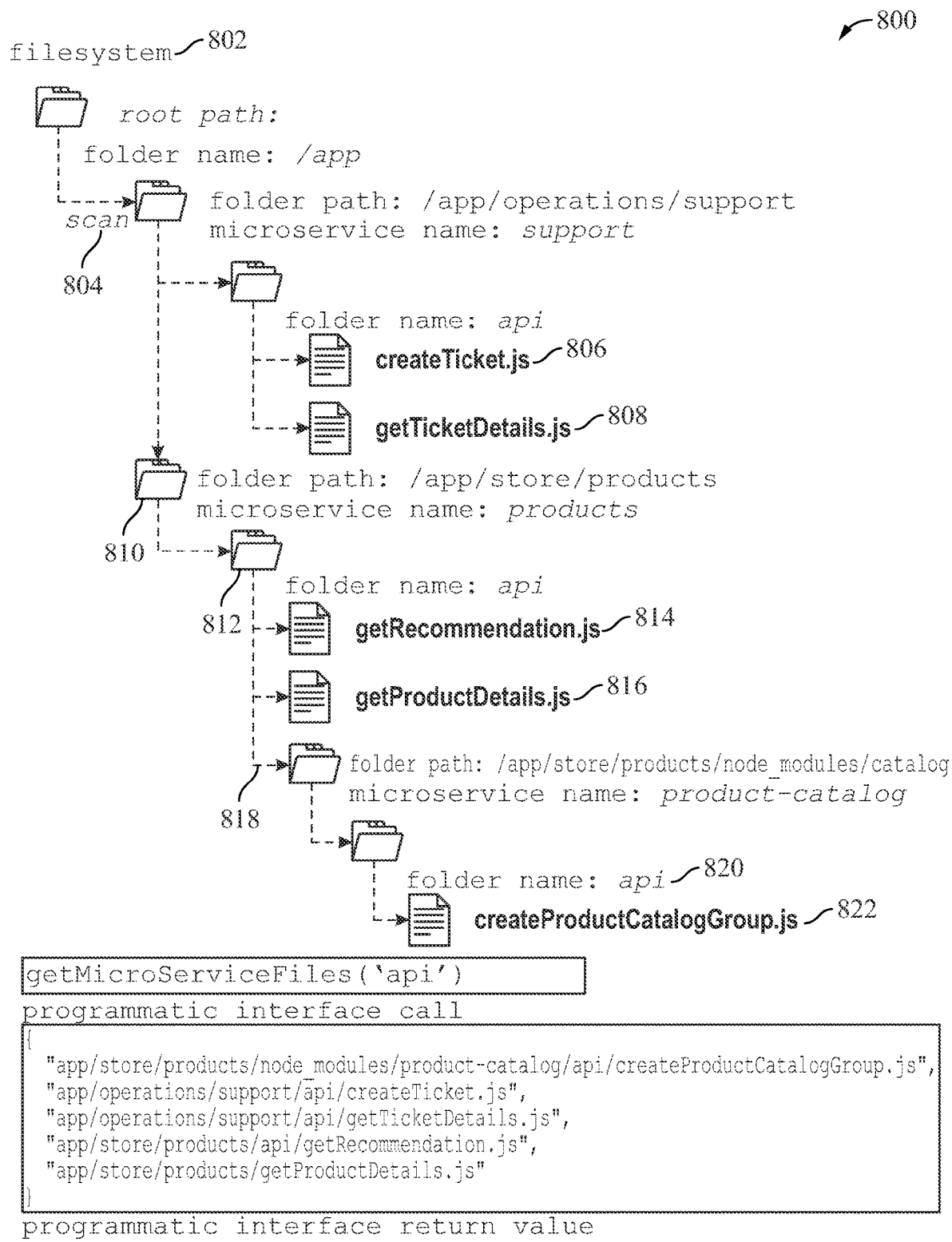
FIG. 8A illustrates one example of an application programming interface for querying discovered microservice information according to some embodiments described herein.
Figure 8B:
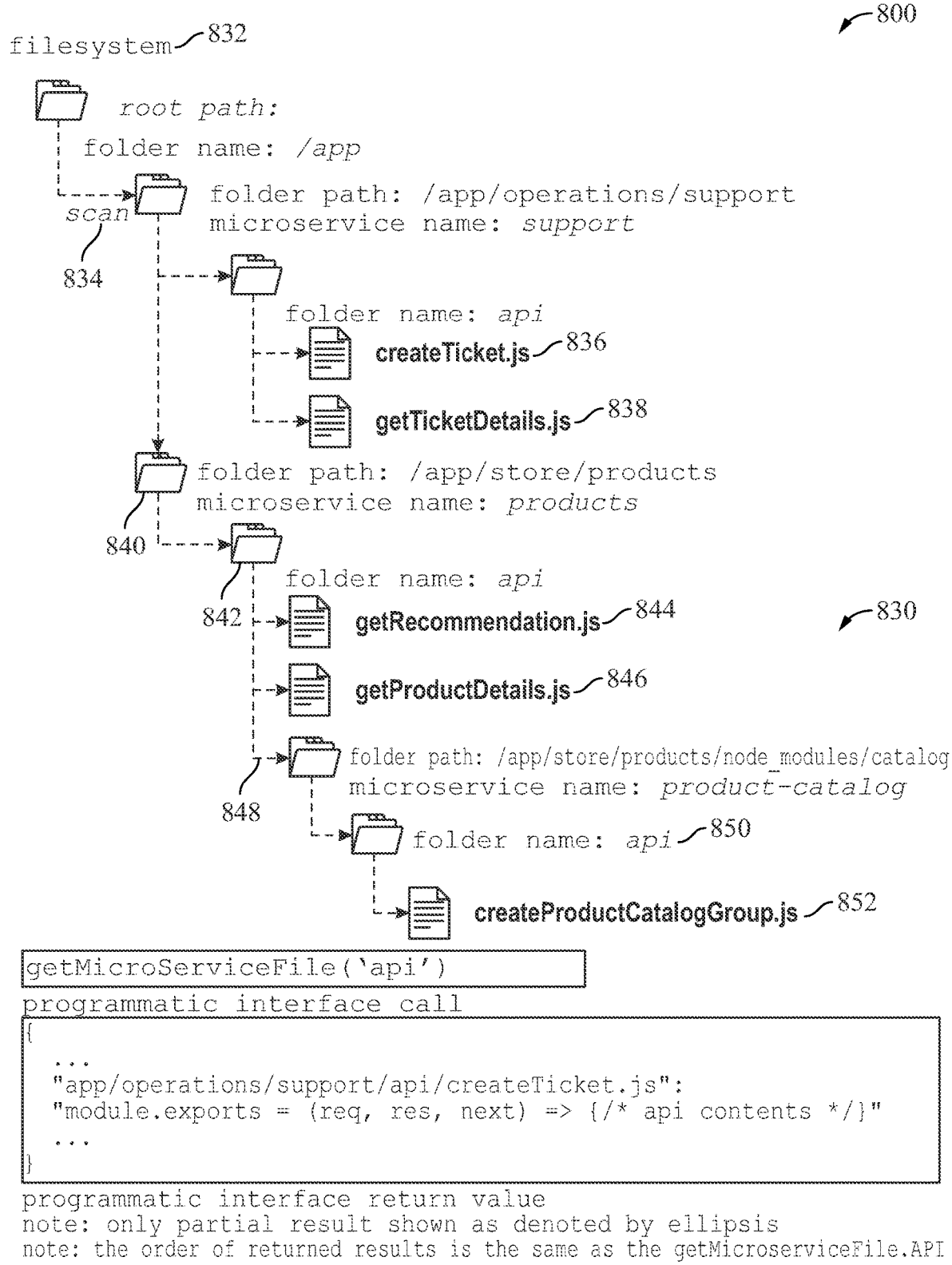
FIG. 8B illustrates another example of an application programming interface for querying discovered microservice information according to some embodiments described herein.
Figure 8C:
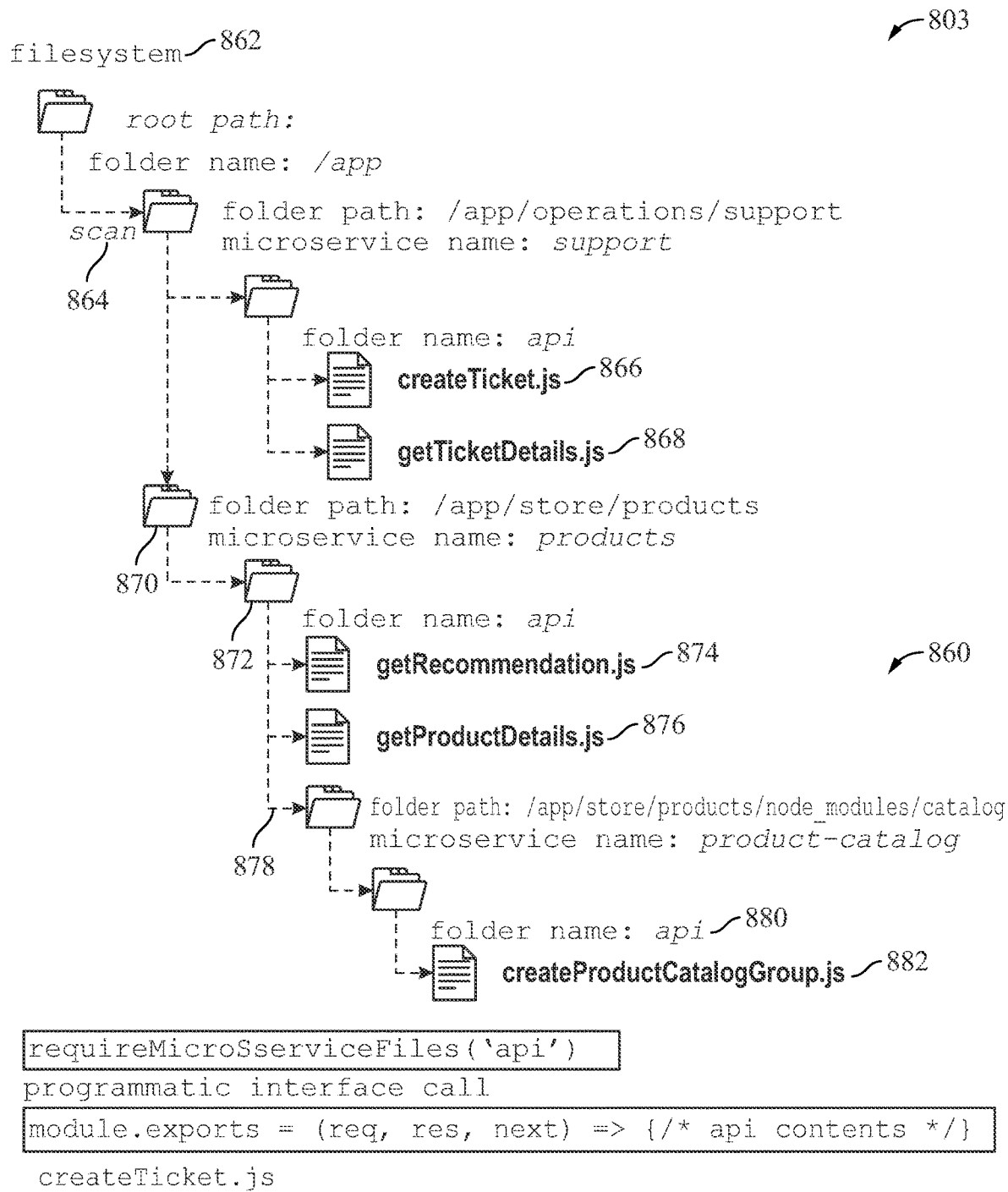
FIG. 8C illustrates yet another example of an application programming interface for querying discovered microservice information according to some embodiments described herein.

FIGS. 8A through 8C illustrate that the methods described herein produce an efficient ability to lookup microservices contained within a root path. A significant challenge that many software development teams face is how to go about organizing files within a microservice ecosystem. Other existing methods provide ways for developers to explicitly specify or locate where other microservices live within the filesystem (e.g. Yarn Workspaces, Lerna). Not only do these systems require explicit or semi-explicit definition of where microservices live, but there are no provided mechanisms for querying files or resources within those specified microservices. At most, these existing methods offer very basic symbolic linking allowing developers to readily specify depending on the microservice(s) by name rather than by path. This means developers only need to update one filesystem path if they need to re-organize where microservices live.

The processes outlined herein allow for building a query interface on top of the contained microservices of a microservice cache. This means that a listing of files can be quickly retrieved from microservices without explicitly specifying where that microservice lives and without requiring there to be an explicit understanding of what files are to be retrieved. This may significantly improve the flexibility that developers have in organizing their microservice ecosystem. Several query interfaces are defined herein as application programming interfaces. One example of such an application programming interface includes querying the paths of all files within all microservices within the root path filesystem location. (E.g., see See: https://saasworks.githhub.io/docs/products/microhost/guides/filesystem/api.html#file-queries)

In the example embodiment diagram 800 depicted in FIG. 8A, programmatic interfaces access the contained microservices of a microservice cache retrieves all files listed under the path within each microservice as specified by a programmatic interface call. In FIG. 8A, this includes querying the paths of all files within all microservices within the root path filesystem location (excluding package manager managed files) and querying the paths of all files and their contents within all microservices within the root path filesystem location.

A search of filesystem 802 can include a root path 804 with folder name: /app scanning 804 folder path: /app/operations/support microservice name: support, which can include folder name: api that includes createTicket.js 806 and getTicketDetails.js 808. folder path: /app/store/products microservice can also lead to folder path: /app/store/products with microservice name: products 810. In turn folder name: api 812 can include getRecommendation.js 814, getProductDetails.js 816, and folder path: /app/store/products/node_modules/catalog with microservice name: product-catalog 818. In turn this can include folder name: api 820, which can include createProductCatalogGroup.js 822.

An example of a programmatic interface call can be getMicroserviceFiles(api). An example of a programmatic interface return value can be:

```
[
    "app/store/products/node_modules/product-
catalog/api/createProductCatalogGroup.js",
    "app/operations/support/api/createTicket.js",
    "app/operations/support/api/getTicketDetails.js",
    "app/store/products/api/getRecommendation.js",
    "app/store/products/getProductDetails.js
]
```

In the example embodiment diagram 830 depicted in FIG. 8B, programmatic interfaces access the contained microservices of a microservice cache or performs a new microservices discovery process in the root path and retrieves all files listed under the path within each microservice as specified by a programmatic interface call and returns a hashmap with the filename as the key and the value as set to the file contents.

A search of filesystem 832 can include a root path 834 with folder name: /app scanning 834 folder path: /app/operations/support microservice name: support, which can include folder name: api that includes createTicket.js 836 and getTicketDetails.js 838. folder path: /app/operations/support microservice can also lead to folder path: /app/store/products with microservice name: products 840. In turn folder name: api 842 can include getRecommendation.js 844, getProductDetails.js 846, and folder path: /app/store/products/node_modules/catalog with microservice name: product-catalog 848. In turn this can include folder name: api 850, which can include createProductCatalogGroup.js 852.

An example of a programmatic interface call can be getMicroserviceFileContents(api). An example of a programmatic interface return value can be:

```
[
    ...
    "app/operations/support/api/createTicket.js",
        "module.exports = (req, res, next) => {/* api contents */}"
    ...
]
```

Note, only partial result shown as denoted by ellipses and note, the order of returned results is the same as the getMicroserviceFile API.

FIG. 8C shows an example embodiment diagram 860 depicting programmatic interfaces access the contained microservices of a microservice cache and executes all files listed under the path within each microservice as specified by the programmatic interface. In FIG. 8C, this includes querying the paths of all files and importing and executing their code contents into a code run-time within all microservices within the root path filesystem location (excluding package manager managed package files). In the example depicted in FIG. 8C, API files may be required so as to register them within a Node.js server in some more automated way than without using this method. Without this method, in a Node.js server, developers may implement "router files" that contain all of the file path references to make available as API endpoints. In such cases, the organization of a microservice ecosystem may be brittle and could require numerous changes if the location of the microservice or its contained files were to change. Some IDE's like Microsoft Visual Code have implemented tracking of renamed files and folders for automated code refractors, but the reliability of these features is not comprehensive or identical across all situations.

A search of filesystem 862 can include a root path 864 with folder name: /app scanning 834 folder path: /app/operations/support microservice name: support, which can include folder name: api that includes createTicket.js 866 and getTicketDetails.js 868. folder path: /app/operations/support microservice can also lead to folder path: /app/store/products with microservice name: products 870. In turn folder name: api 872 can include getRecommendation.js 874, getProductDetails.js 876, and folder path: /app/store/products/node_modules/catalog with microservice name: product-catalog 878. In turn this can include folder name: api 880, which can include createProductCatalogGroup.js 882.

An example of a programmatic interface call can be requireMicroserviceFiles('api'). An example of a createTicket.js can be module.exports=(req, res, next)=>{/* api contents */}

Figure 9:
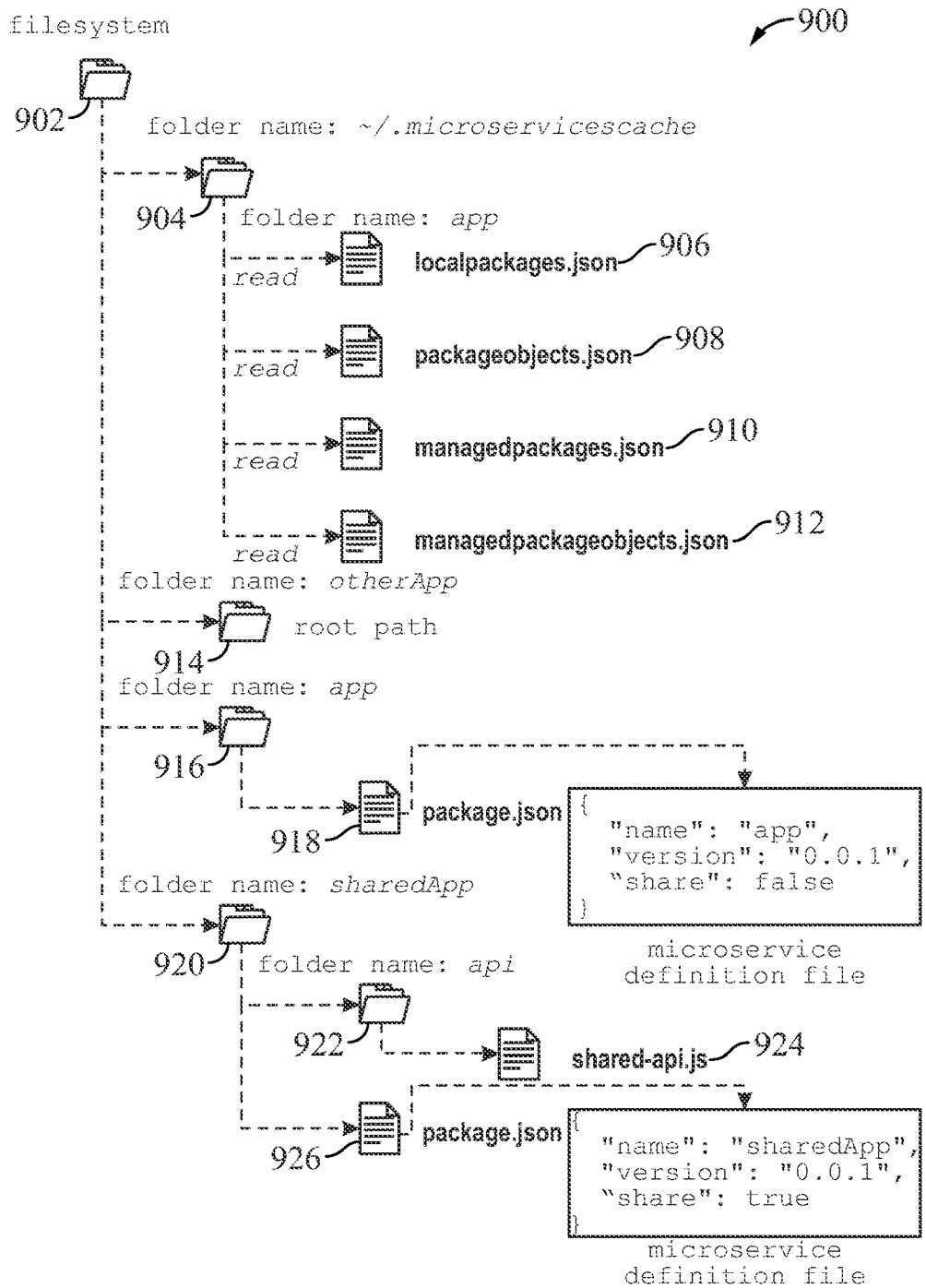
FIG. 9 illustrates yet another example of an application programming interface for querying discovered microservice information according to some embodiments described herein.

As another example embodiment, diagram 900 of FIG. 9 illustrates that, in addition to querying files from within the contained microservices of a microservice cache, it is also possible to query files from within the global microservices cache. This means that disparate file trees and collections of microservices that do not share a path with the root path are able to be readily searched. Since this operation may be slower and yield more files, a separate query interface is provided. Additionally, it is possible to require a microservice to explicitly declare whether or not it should be searchable via the global microservices cache to further optimize global queries. This explicit allow/disallow of searchability can be specified in the microservice definition file.

This set of operations and concepts can be extended onto networked computers. Instead of accessing the global microservices cache via the local filesystem, a query request may be forwarded to a networked computer that would run the same query on its filesystem and deliver back the result. This architecture can be extended to hundreds of machines, for example to collate log files across a network of microservices.

FIG. 9 shows an example embodiment diagram 900, showing that from within the /otherApp directory, collections of microservices from within disparate file trees are able to be queried using the application programming interface. The microservice definition file is able to further specify whether or not the microservice files are to be shared using this API.

A search of filesystem 902 can include folder name: ~/.microservicescache 904, which can store folder name: app. Here, read operations for localpackages.json 906, packageobjects.json 908, managepackages.json 910, and/or managedpackageobjects.json 912 can be performed. folder name: otherApp 914 can include root path. folder name: app 916 can include package.json, which includes a microservice definition file including:

```
{
    "name": "app",
    "version": "0.0.1",
    "share": false
}
``` folder name: sharedApp 920 can include folder name: api 922 including shared-api.js 924. folder name: sharedApp 920 can also include package.json, which includes a microservice definition file including:

```
{
    "name": "sharedApp",
    "version": "0.0.1",
    "share": true
}
```

An example of a programmatic interface call can be getSharedMicroserviceFiles('api')// from within /otherApp path. An example of a programmatic interface return value can be:

```
[
    "otherApp/api/shared-api.js"
]
```

Figure 10:
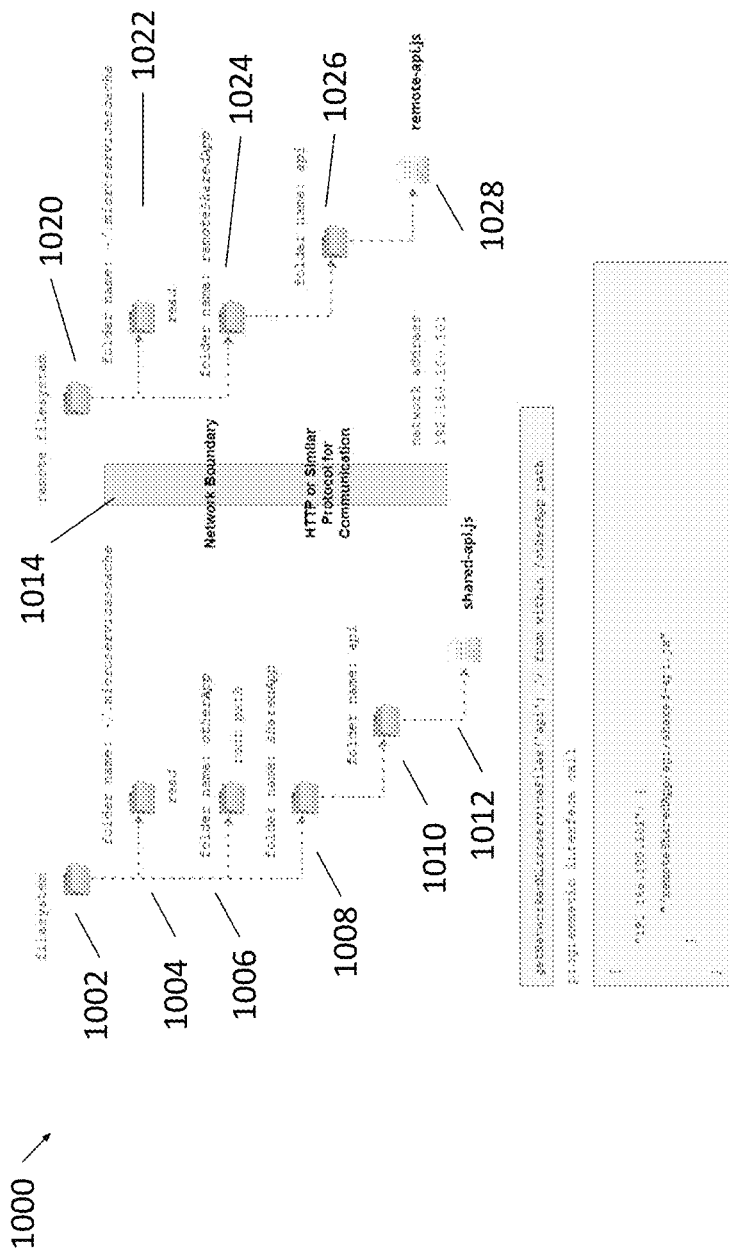
FIG. 10 illustrates yet another example of an application programming interface for querying discovered microservice information according to some embodiments described herein.

FIG. 10 shows an example embodiment diagram 1000, illustrating the utilization of a pattern for declaring a package to be searchable in the global filesystem cache, a microservice can be marked so as to make itself available over a network gateway as a web server.

A search of filesystem 1002 can include folder name: ~/.microservicescache 1004, which can be read. filesystem 1002 can also include folder name: otherApp, including the root path. filesystem 1002 can also include folder name: sharedApp 1008, which can include folder name: api 1010, which can include shared-api.js. A network boundary 1014 can require use of HTTP or similar protocol (e.g. UDP or Web Sockets) for communication where two microservice hosts may communicate to perform queries remotely to return filesystem information for hosted microservices. For example, remote filesystem 1020 can include folder name: ~/.microservicescache 1022, which can be read. remote filesystem 1020 can also include folder name: remoteSharedApp 1024, which can include folder name: api, which can include remote-api.js 1028.

An example of a programmatic interface call can be getNetworkedMicroserviceFiles('api') //from within /otherApp path. An example of a programmatic interface return value can be:

```
[
    "192.168.100.101": [
        "/remoteSharedApp/api/shared-api.js"
    ]
]
```

Figure 11:
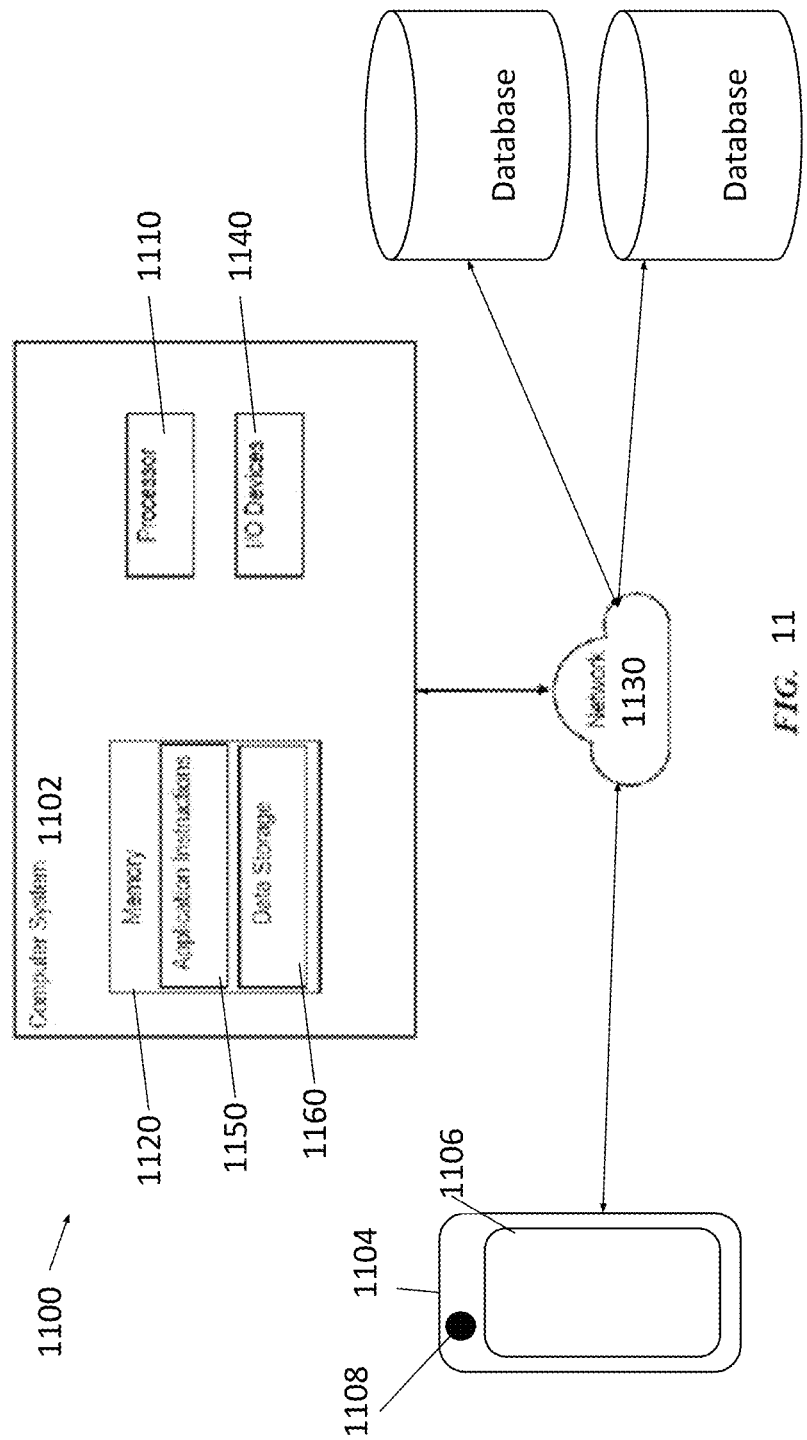
FIG. 11 illustrates a system architecture diagram according to some embodiments.

FIG. 11 illustrates a system architecture diagram 1100, including a computer system 1102, which can be utilized to provide and/or execute the processes described herein in various embodiments. The computer system 1102 can be comprised of a standalone computer or mobile computing device, a mainframe computer system, a workstation, a network computer, a desktop computer, a laptop, a tablet, a smartphone, a videogame console, or the like. The computer system 1102 includes one or more processors 1110 coupled to a memory 1120 via an input/output (I/O) interface. Computer system 1102 may further include a network interface to communicate with the network 1130. One or more input/output (I/O) devices 1140, such as video device(s) (e.g., a camera), audio device(s), and display(s) are in operable communication with the computer system 1102. In some embodiments, similar I/O devices 1140 may be separate from computer system 1102 and may interact with one or more nodes of the computer system 1102 through a wired or wireless connection, such as over a network interface. In many embodiments, computer system 1102 can be a server that is fully automated or partially automated and may operate with minimal or no interaction or human input during processes described herein. As such, many embodiments of the processes described herein can be fully automated or partially automated.

Processors 1110 suitable for the execution of a computer program include both general and special purpose microprocessors and any one or more processors of any digital computing device. The processor 1110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

A network interface may be configured to allow data to be exchanged between the computer system 1102 and other devices attached to a network 1130, such as other computer systems, or between nodes of the computer system 1102. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel storage area networks (SANs), or via any other suitable type of network and/or protocol.

The memory 1120 may include application instructions 1150, configured to implement certain embodiments described herein, and at least one database or data storage 1160, comprising various data accessible by the application instructions 1150. In at least one embodiment, the application instructions 1150 may include software elements corresponding to one or more of the various embodiments described herein. For example, application instructions 1150 may be implemented in various embodiments using any desired programming language, scripting language, or combination of programming languages and/or scripting languages (e.g., C, C++, C#, JAVA®, JAVASCRIPT®, PERL®, etc.).

The steps and actions of the computer system 102 described in connection with the embodiments disclosed herein may be embodied directly in hardware, in a software module executed by a processor, or in a combination of the two. A software module may reside in random-access memory (RAM), flash memory, read-only memory (ROM) memory, erasable programmable read-only memory (EPROM) memory, electrically erasable programmable read-only memory (EEPROM) memory, registers, a hard disk, a solid-state drive (SSD), hybrid drive, dual-drive, a removable disk, a compact disc read-only memory (CD-ROM), digital versatile disc (DVD), high definition digital versatile disc (HD DVD), or any other form of non-transitory storage medium known in the art or later developed. An exemplary storage medium may be coupled to the processor 1110 such that the processor 1110 can read information from, and write information to, the storage medium. In the alternative, the storage medium may be integrated into the processor 1110. Further, in some embodiments, the processor 1110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, Bluetooth, Wi-Fi, microwave, or others, then the coaxial cable, fiber optic cable, twisted pair, DSL, or wireless technologies such as infrared, radio, Bluetooth, Wi-Fi, microwave, or others can be included in the definition of medium. "Disk" and "disc," as used herein, include compact disc (CD), laser disc, optical disc, digital versatile disc (DVD), floppy disk, and Blu-ray disc or others where disks usually reproduce data magnetically, while discs usually reproduce data optically with lasers. Combinations of the above should also be included within the scope of computer-readable media.

It should be understood by those in the art that computer system 1102 also includes power components that are operably coupled such that the system is operable. This can include one or more batteries if computer system 1102 is mobile.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device 1102.

As shown in the example embodiment, a user device could be a laptop computer, desktop computer, or mobile computing device 1104 that can also be communicatively coupled with and exchange data with network 1130. Those in the art will understand that a mobile computing device 1104 can include some or all of the same or similar components as computer system 1102, coupled to constitute an operable device. Mobile computing device 1104 can be a personal digital assistant (PDA), smartphone, tablet computer, laptop, wearable computing device such as a smartwatch or smart glasses, or other device that includes one or more user interface 1106, such as a touchscreen and/or audio input/output and/or other display and user input components. Mobile computing device 1104 can also include one or more image capturing or reading component 1108 (e.g. a digital camera, scanner, or others) and associated structures and elements operatively coupled to at least one processor and memory of the mobile computing device. Such image capturing component 1108 can be operable to capture an image automatically or upon one or more user input commands.

Also shown in FIG. 11 are one or more database(s). These databases can be locally stored in memory or remotely stored in memory that is accessible by computer system 1102 via network 1130 and may be proprietary, public, or some combination thereof. These databases can also be third-party or system databases in some embodiments and may have one of any manner of structures, privacy measures, and other features and elements.

Figure 12:
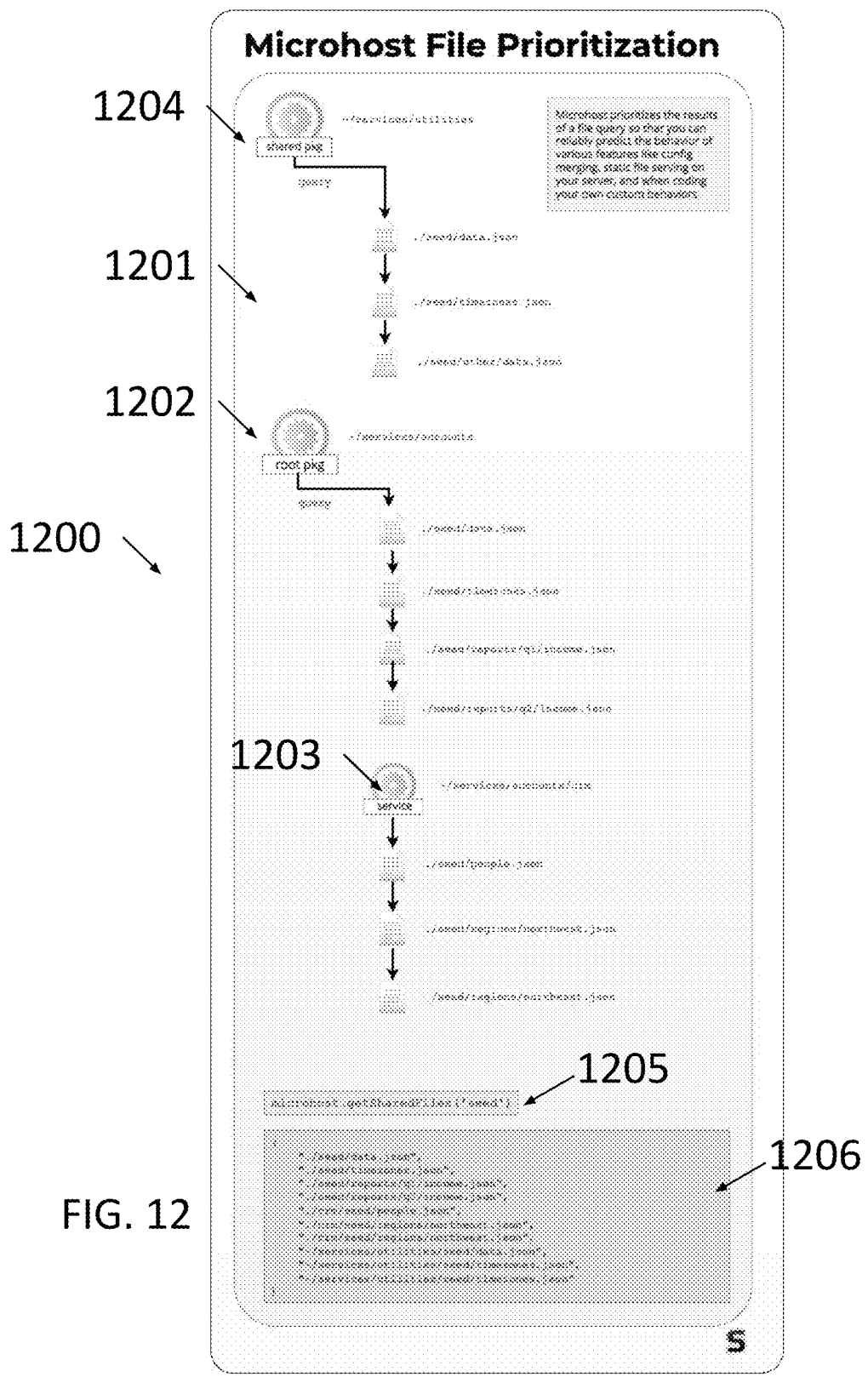
FIG. 12 illustrates an example of an interface sample according to some embodiments described herein.

FIG. 12 illustrates an example embodiment diagram 1200, showing that when files are returned from the query API, they may be returned in order of specificity and relevance. To illustrate, the following categories of files may be returned in the following order: 1) networked file queries; 2) package manager managed files from the global microservices cache; 3) locally managed files from within the global microservices cache; 4) package manager managed files from the contained microservices of a microservice cache; and 5) locally managed files from within the contained microservices of a microservice cache. (E.g. see: https://saasworks.github.io/docs/products/microhost/guides/beginner/query-files.html#returned-order-of-files-from-filesystem-queries). It will be appreciated that any ordering of files returned from networked queries may be subject to the same or similar ordering stipulated by items 2-5 above.

Most filesystems are organized by their users in order from generic to specific based on the depth of a folder and file within the filesystem. This means that files contained within /a/b/c/d would generally be considered as more specific than files contained within /a/b/c. Within each of the steps 2-5, the files returned are ordered by the depth of the file in the filesystem, with the deepest files returned first. For files with the same depth, they are organized alphabetically. For instance, the following ordering may occur: 1) /a/b/c/d; 2) /a/b/c/e; 3) /a/c/b/b; 4) /a/c/c/b; and 5) /a/c/c/c.

There are various use cases in which the order of returned results may be important. As one example, it may be desirable to merge config files and have the order of the returned config files merged in order such that the services' configs closer to the root path are overriding services' configs further from the root path in both relevance and depth. As another example, it may be desirable to host static webserver files by sourcing files from all microservices but have services' files closer to the root path to be served instead of services' files further from the root path. As yet another example, it may be desirable to execute files in a specific order so that the execution of files closer to the root path override behavior of execution of files further from the root path.

A search of filesystem 1201 can include a root path package 1202 "accounts", a local package 1203 "crm" and a shared package 1204 "utilities", which can be read using a file query 1205 "getSharedFiles" in the "seed" folder. filesystem 1201 can also include files in the "accounts" package 1202: ./seed/data.json, ./seed/timezones.json, ./seed/reports/q1/income.json, ./seed/reports/q2/income.json. filesystem 1201 can also include files in the "crm" package 1203: ./seed/people.json, ./seed/regions/northeast.json, ./seed/regions/northwest.json. filesystem 1201 can also include files in the "utilities" package 1204: ./seed/data.json, ./seed/timezones.json, ./seed/other/data.json. Query 1205 can result in 1206 which is a priority ordered list of files read in order by root path 1202 first, local package crm 1203 second, and shared package utilities 1204 last. Each of the package files in 1201 are returned in order of depth in 1206, and then alphabetically within each depth.

Figure 13A:
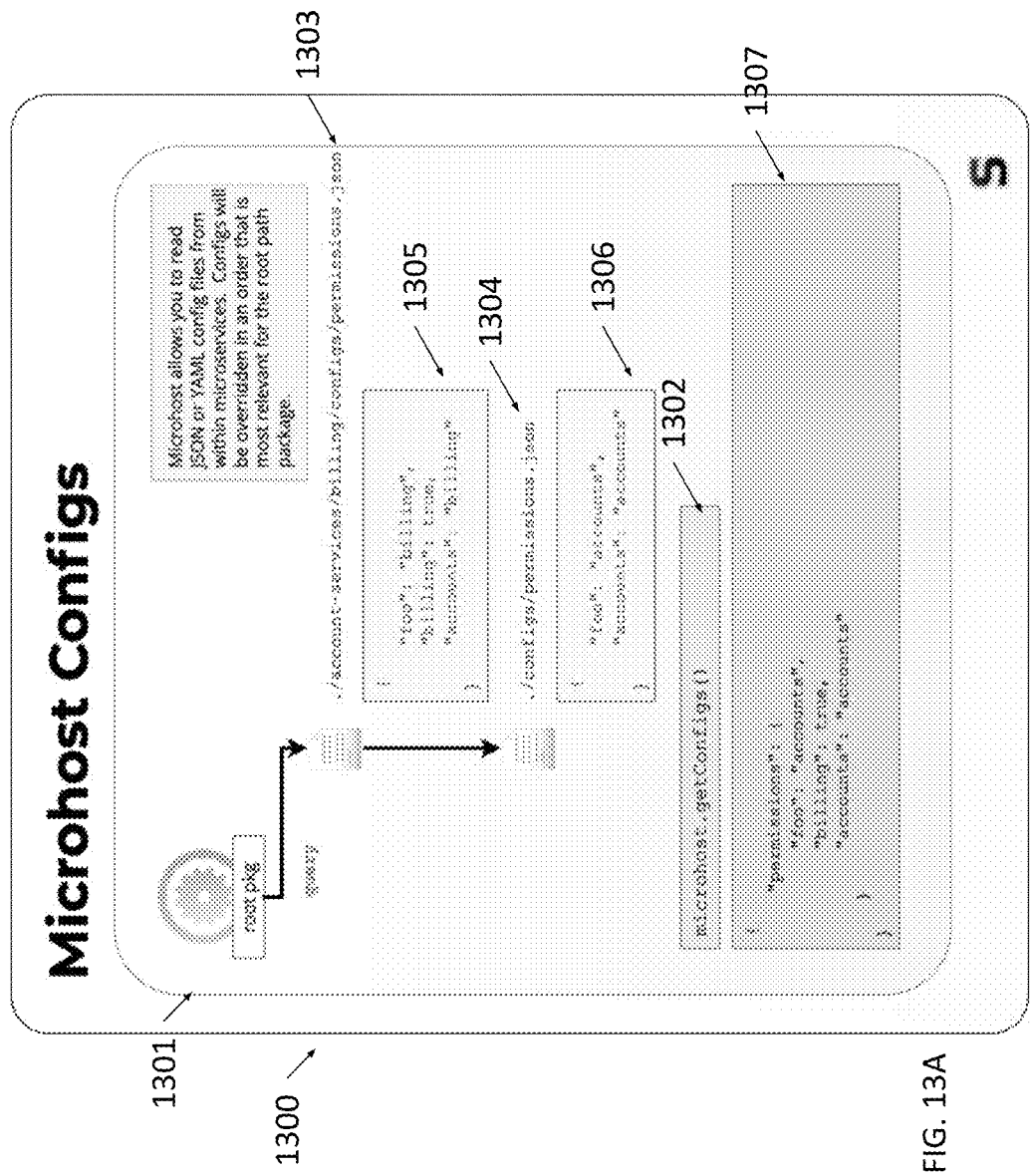
FIG. 13A illustrates a framework diagram, according to some embodiments described herein.

FIG. 13A illustrates an example embodiment diagram 1300 showing how file queries (e.g. as described with respect to FIG. 8B) can be used to return the file contents of JSON files by relying on JSON merging in a priority order (e.g. as described with respect to FIG. 12). These queries allow developers to contain only the most necessary configuration information within each microservice, since information can be inherited from other discovered microservices. In this way, additional microservices can depend on the configuration specified by one microservice, which can itself override and/or specify its own configurations.

A search of filesystem 1301 can include a root path package that can be queried using an interface 1302. This interface can make a file query (e.g. as shown and described with respect to FIG. 8B) to retrieve file contents in the "configs" folder of discovered microservices. In addition, a package called "billing" can contain a file 1303 "configs/permissions.json". The root path package can contain a file 1304 "configs/permission.json" as well. In its contents, "billing" file 1303 can contain JSON key value pair contents 1305: key "billing" is equal to value "true" and key "accounts" is equal to value "billing." In its contents, root path package file 1304 contains JSON key value pair contents 1306: key "billing" does not exist like it does in file 1305 and key "accounts" is equal to "accounts". Query 1302 can result in merged JSON data of file contents in a filesystem of discovered microservices 1307: key "billing" is equal to "true" and key "accounts" is equal to "accounts" to reflect that the JSON file 1303 and 1304 resulting from file query 1302 having been merged 1307.

Figure 13B:
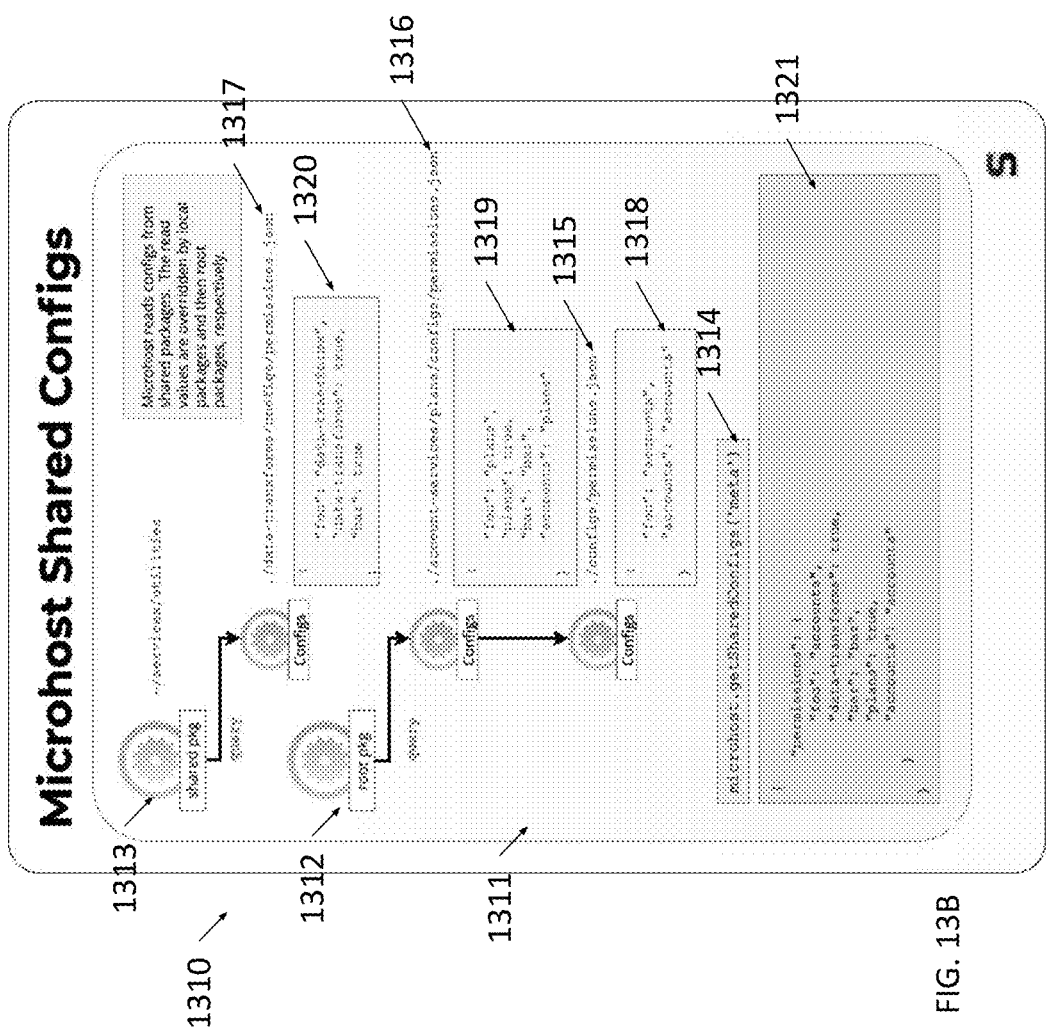
FIG. 13B shows an example embodiment diagram depicting how file queries used to merge JSON files rely on the prioritization order.

FIG. 13B shows another example embodiment diagram 1310 depicting how file queries used to merge JSON files rely on the prioritization order (e.g. as shown and described with respect to FIG. 12). A search of filesystem 1311 containing a root package tree 1312 and a shared package 1313 uses the query 1314 to result in 1321. Root package 1312 can contain file 1316: "configs/permissions.json". Root package 1312 can contain a local package implied by 1315: "account-services/plans" and its file "configs/permissions.json". Shared package root 1313 "utilities" can contain a local package implied by 1317: "data-transforms" and its file "configs/permissions.json". In its contents, file 1318 can contain JSON key value pair contents: key "accounts" has value "accounts". In its contents, file 1319 can contain JSON key value pair contents: key "accounts" has value "plans" and key "bar" has value "baz" and key "plans" has value "true". In its contents, file 1320 can contain JSON key value pair contents: key "data-transforms" has value "data-transforms" and key "bar" has value "true" and key "foo" has value "data-transforms". Query 1314 can result in merged JSON data of file contents in filesystem of discovered microservices 1321: key "accounts" is equal to "accounts" and key "plans" is equal to true and key "bar" is equal to "baz" and key "data-transforms" is "data-transforms" to true to reflect that the JSON file 1315, 1316 and 1317 resulting from file query 1314 have been merged in 1321.

Figure 14A:
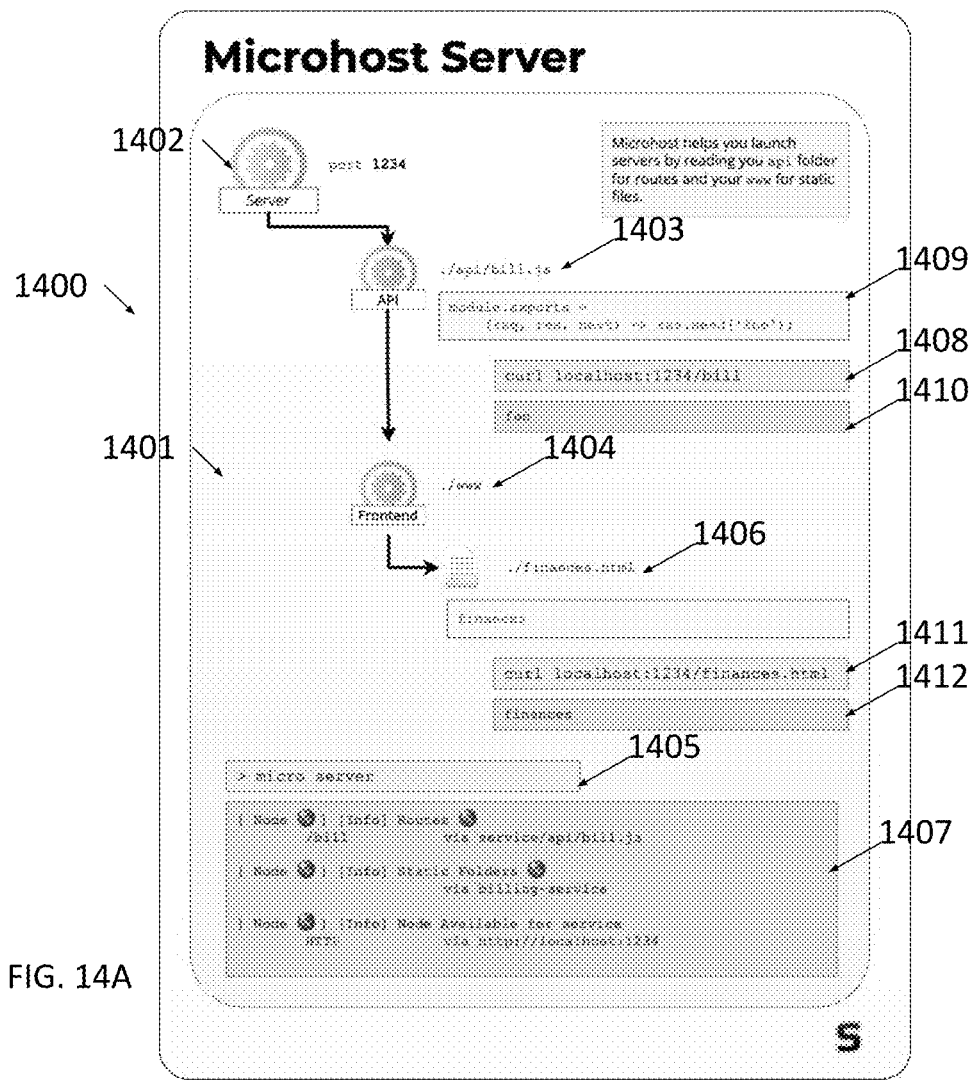
FIG. 14A illustrates a diagram depicting how file queries can be used to organize API files and static web server folders in discovered microservices so that a developer can start a web server and expect ambiguously known API files and static web server folders to become available over a network, according to some embodiments described herein.

FIG. 14A illustrates an example embodiment diagram 1400 showing how file queries (e.g. as shown and described with respect to FIG. 8A and FIG. 8C) can be used to organize Express.js API files and static web server folders in discovered microservices so that a developer can start a web server and expect ambiguously known API files and static web server folders to become available over a network.

As shown, a filesystem 1401 can contain a root path package that is run as a web server 1402. The package can contain an API file 1403: "api/bill.js" and a static web server folder 1404 containing 1406: "finances.html". The server is started by running command 1405 in root path package directory 1402. This will execute file queries (e.g. as outlined by FIG. 8C) to read and index API file 1403 to be served as an Express.js route and this will execute file queries (e.g. as outlined by FIG. 8A) to index a static web server folder 1404 to serve static files. Running command 1405 will result in 1407 describing what API files are being served and what static web server folders are being served and at what network address. Requesting with 1408 Express.js route created by API file 1403 results in code being executed in 1409 to return a HTTP response body 1410. Requesting with 1411 results in file 1406 being read and its contents to be sent as HTTP response body 1412.

Figure 14B:
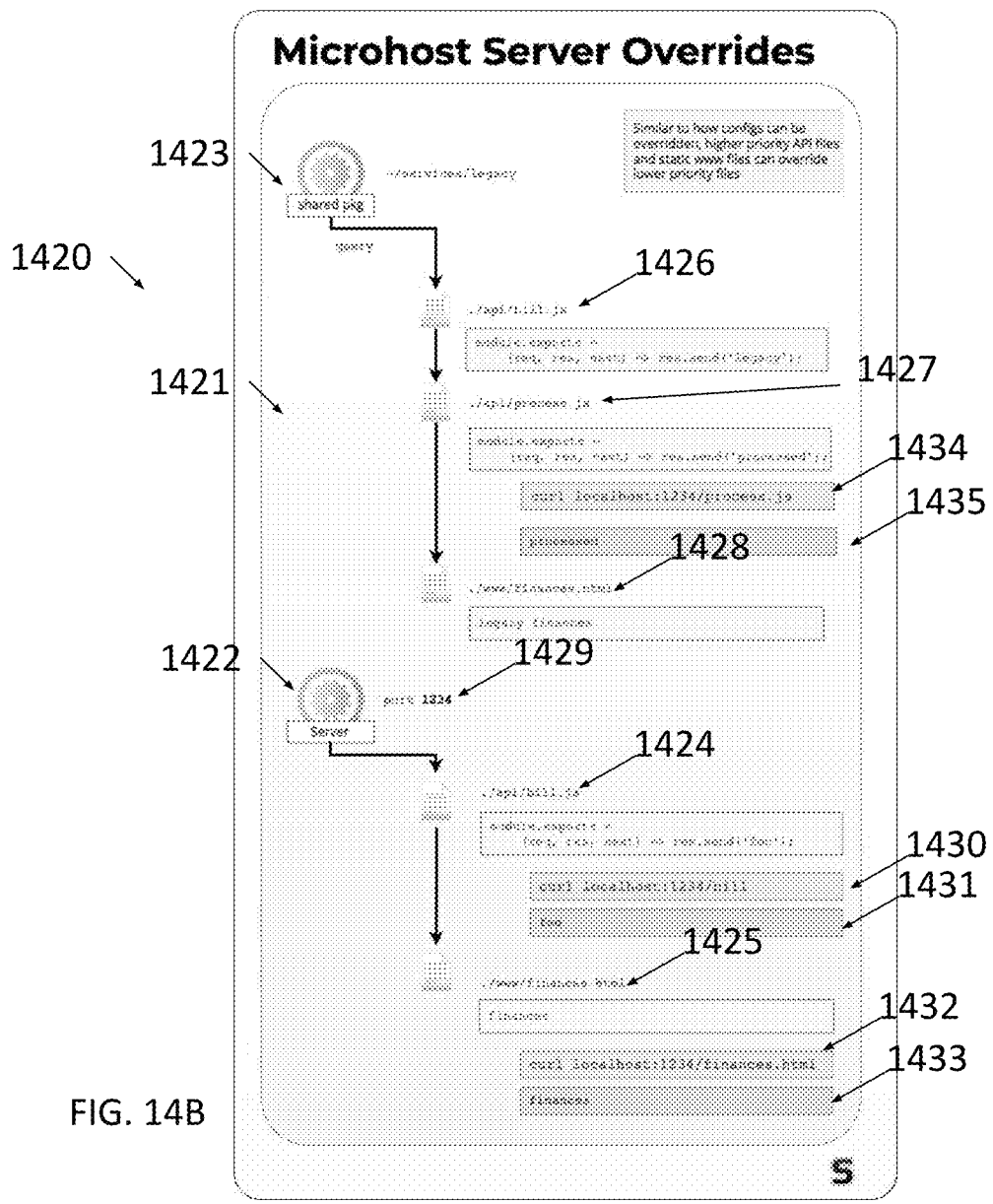
FIG. 14B illustrates a diagram depicting how file query priorities can impact how web servers function with ambiguously known API's and static web folders of discovered microservices to be served over the network and furthermore allowing higher priority files to override lesser priority files, according to some embodiments described herein.

FIG. 14B illustrates an example embodiment diagram 1420 showing how file query priorities (e.g. as outlined with respect to FIG. 12) can impact how web servers function with ambiguously known API's and static web folders of discovered microservices to be served over the network and allow higher priority files to override lesser priority files.

A filesystem 1421 can contain a root path package running a server 1422 and a shared package 1423. The root path package can additionally include API file: "api/bill.js" 1424 and static web server file 1425: "www/finances.html". The shared package can additionally include API file: "api/bill.js" 1426 and API file: "api/process.js" 1427 and static web server file: "www/finances.html" 1428. When the started web server is listening on port 1234 (1429) it can be HTTP requested with 1432 to result in 1433 response body: "finance". This reflects that the shared package version of "finances.html" 1428 is preempted by the root path package version of "finances.html" because it is a higher priority file outlined by FIG. 12. The web server listening on port 1234 (1429) can be HTTP requested with 1430 to result in 1431 response body: "foo". This reflects that the shared package version of "bill.js" 1426 is preempted by the root path package version of "bill.js" because it is a higher priority file (e.g. as outlined with respect to FIG. 12). The web server listening on port 1234 (1429) can be HTTP requested with 1434 to result in 1435 response body: "processed". This reflects that all ambiguously known files are gathered, possibly preempted according to their priority and served over the network. Because file 1427 is not preempted by a higher priority file, the resulting response body 1435 is served.

Figure 15:
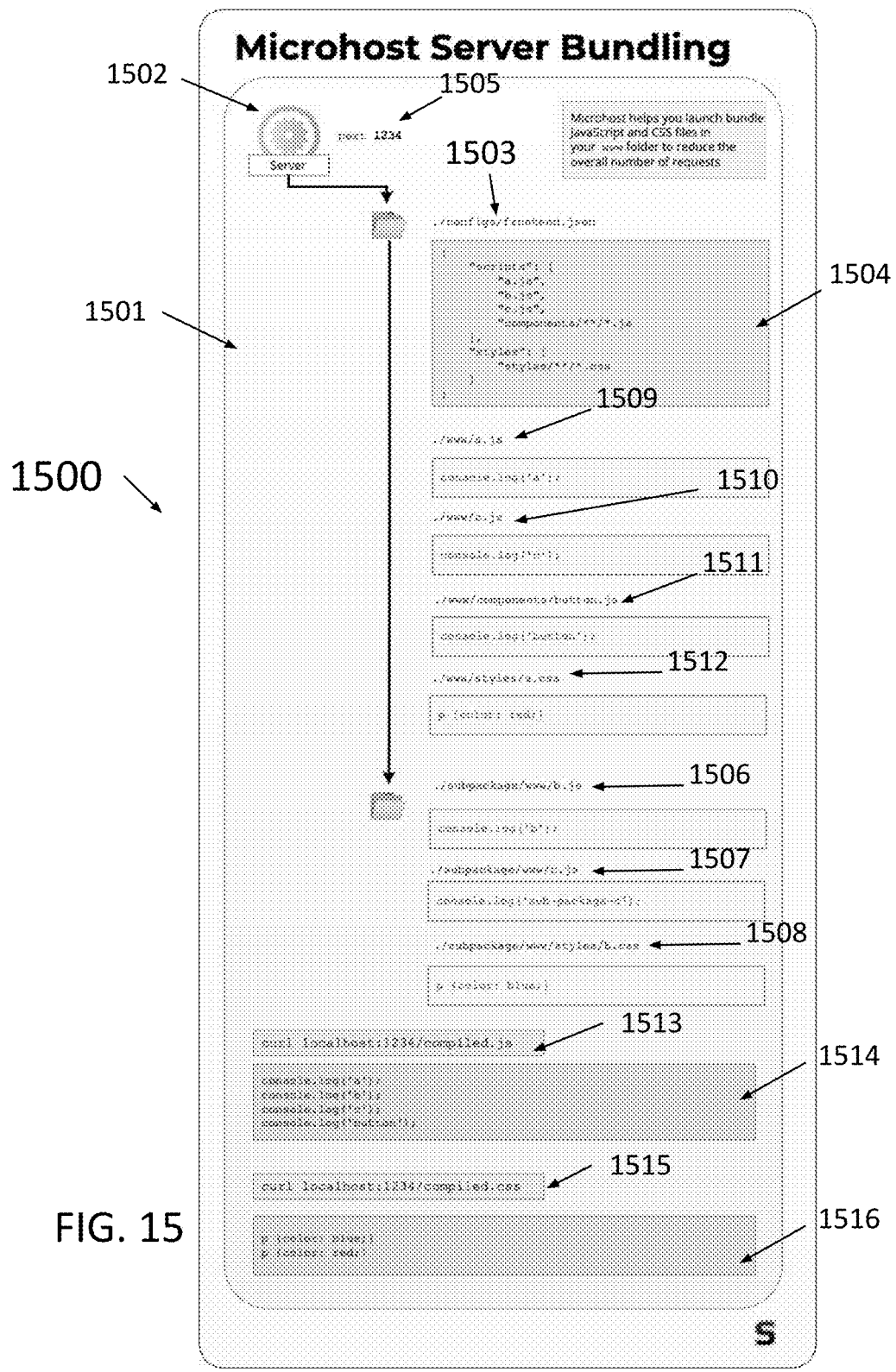
FIG. 15 illustrates a diagram depicting how a query API can be used to retrieve files in the discovered microservice www folder(s) to serve files over a network in what is known as a bundle.

FIG. 15 illustrates an example embodiment diagram 1500 showing how a query API can be used to retrieve files in the discovered microservice www folder(s) to serve files over a network in a bundle. A filesystem 1501 can contain a root path package running a server on port 1505 and a local package with name as implied by files 1506, 1507, 1508: "subpackage". The root path package can additionally include files: "configs/frontend.json" 1503 containing JSON specifying key value pair contents 1504. The local package "subpackage" can additionally include files 1506: "www/b.js", 1507: "www/c.js", 1508: "styles/b.css". The root path package can additionally include files 1509: "www/a.js", 1510: "www/c.js", 1511: "components/button.js", 1512: "styles/a.css". When the web server is queried by 1513, the web server performs a file query to lookup as outlined in FIG. 8B to retrieve the files specified by 1504. If a globstar or wildcard pattern is used, then the files are additionally returned that match that pattern. When the web server is queried by 1513, a JavaScript bundle is created by concatenating the queried file contents. The result is server to user's request 1513 by response 1514. Relying on prioritization described by FIG. 12, the response 1514 includes results from 1510 which has taken higher priority than local package file 1507. Also, exhibiting the value of discovering ambiguously known files across microservices and therefore enabling the composition and merging of microservices and their data to create value, 1514 exhibits that file 1506 from "subpackage" is added to the bundle. Also, exhibiting the value of globstar patterns wildcard in the file query executed in response to 1513, the file 1511: "components/buttons.js" is also included in the bundle. When the web server is queried by 1515, a JavaScript bundle is created by concatenating the queried file contents. The result is server to user's request 1515 by response 1516. Response 1516 shows the concatenated CSS files 1508: "b.css" and 1512: "a.css".

Figure 16:
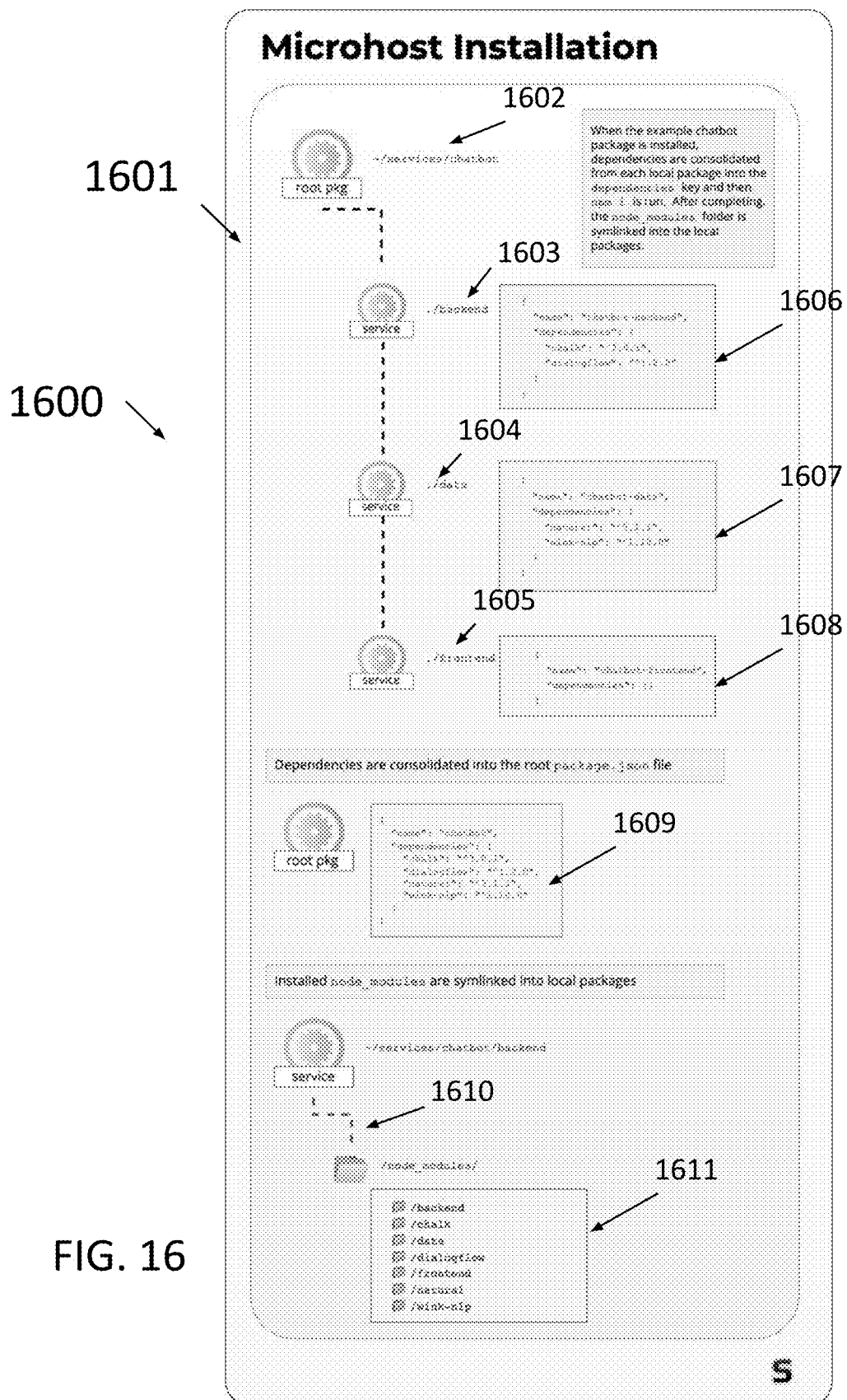
FIG. 16 shows a diagram depicting uses of a package manager is its ability to install dependencies that a microservice specifies, usually in its microservice definition file.

As shown in FIG. 16, one of the primary uses of a package manager is its ability to install dependencies that a microservice specifies, usually in its microservice definition file, e.g. a package.json file for NPM. Installation of dependencies can be time-consuming. Therefore, installing a system of microservice dependencies specified by a microservice definition file can be multiple times more time-consuming than installing one microservice's dependencies. A significant amount of time of installation is often spent installing dependencies that multiple microservices depend on, either directly or indirectly because specified dependencies usually depend on a common or shared set of dependencies. To speed up this installation process, a microservice discovery process can return all microservice definition files and consolidate the directly specified dependencies into the microservice definition file in the root path. Package manager installation of dependencies can then be performed at least once, and the resulting installation files can be symlinked into or otherwise provided for discovered microservices in the root path to depend on.

As shown, a filesystem 1601 can contain a root package file "chatbot" and a local microservice 1602: "./backend" and a local microservice 1603: "./data" and a local microservice 1604: "./frontend". The "./backend" microservice can contain a microservice definition file 1606 containing key value pair contents: with key "dependencies" containing JSON object specifying key value pair contents and therefore: key "chalk" containing value of version string and key "dialogflow" containing value of a version string. The "./data" microservice can contain a microservice definition file 1607 containing key value pair contents: with key "dependencies" containing JSON object specifying key value pair contents and therefore: key "natural": containing value of version string and key "wink-nlp" containing value of a version string. The "./frontend" microservice can contain a microservice definition file 1608 but may contain no similar "dependencies" data. Element 1609 shows that the installation process can first consolidate the dependencies read in by discovered microservices 1602 and 1603 and specified by 1606 and 1607 so that 1609 contains key value pair contents: "with dependencies" containing JSON object specifying key value pair contents: key "chalk", key "dialogflow", key "natural" and key "wink-nlp". The package manager can then be instructed to run its installation, and the dependencies specified by 1609 are installed. Element 1610 exhibits that in every local package (in this case local package 1602) the resulting node_modules folder—that the package manager created during and upon completing the installation—is symlinked. Since the symlinked node_modules contain all of the consolidated dependencies as shown in 1611 and as the result of consolidated dependencies shown by 1609 being installed by the package manager, all packages are guaranteed to have their needed dependency requirements met.

Figure 17:
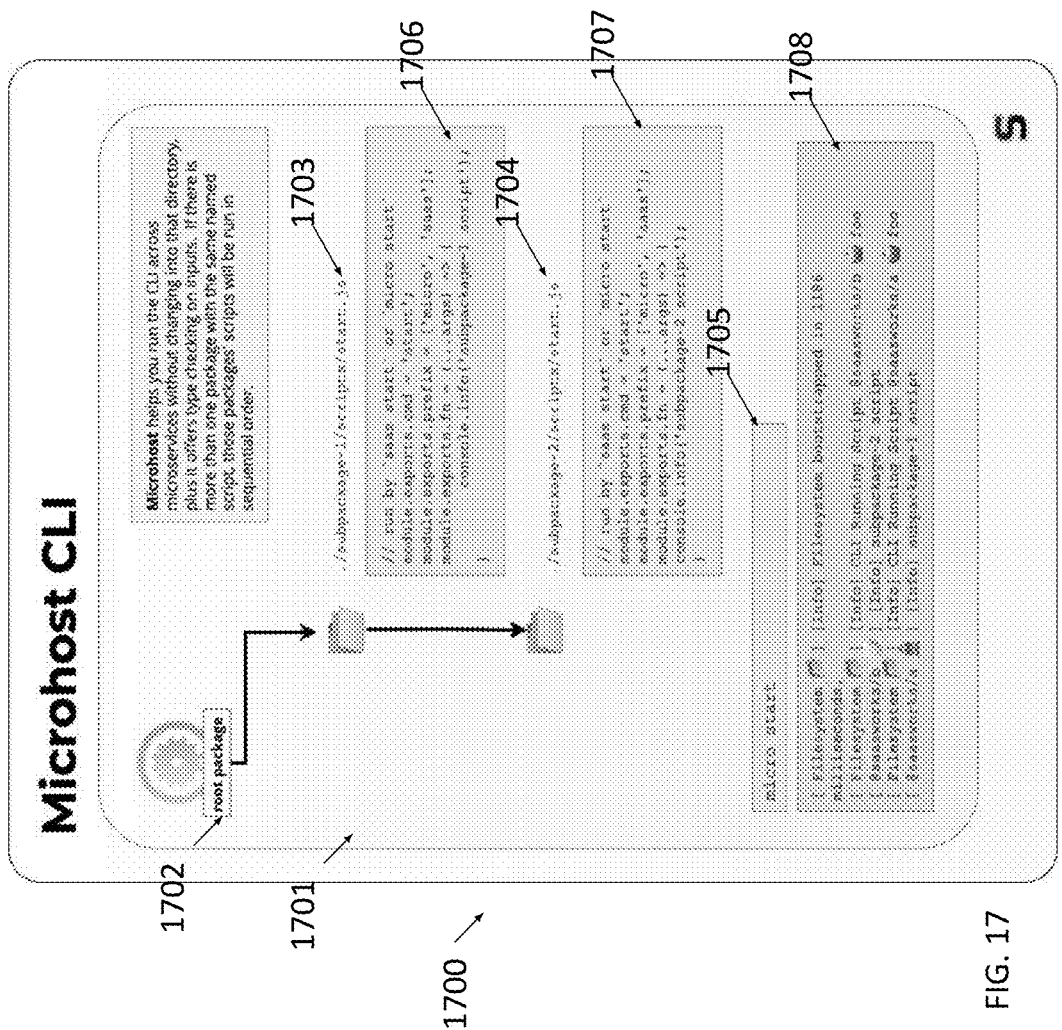
FIG. 17 shows a diagram depicting how file queries of ambiguously known files can identify scripts across discovered microservices, according to some embodiments described herein.

FIG. 17 shows an example embodiment diagram 1700, demonstrating how file queries of ambiguously known files can identify scripts across discovered microservices. These scripts can then be conveniently executed (see FIG. 8C for an underlying pattern). Filesystem 1701 can contain a root package 1702 and a discovered local package "subpackage-1" implied by file 1703; and a discovered local package "subpackage-2" implied by file 1704. The file can be formatted in 1706 and 1707 to include meta-information that indexes the script, so that when a user executes the command 1705, the scripts relevant to the user-executed command are run. This is helpful because without using file queries or package discovery, a user will need to change directory into the directory where they want to run a script. If a user needs to orchestrate scripts as part of a CICD toolchain, they will need to author a script to run other scripts which may rely on fixed or pre-determined filesystem paths which deteriorates development flexibility. Both 1706 and 1707 files specify some execution code that when 1705 is run displays the output from those files' execution code in 1708.

Figure 18:
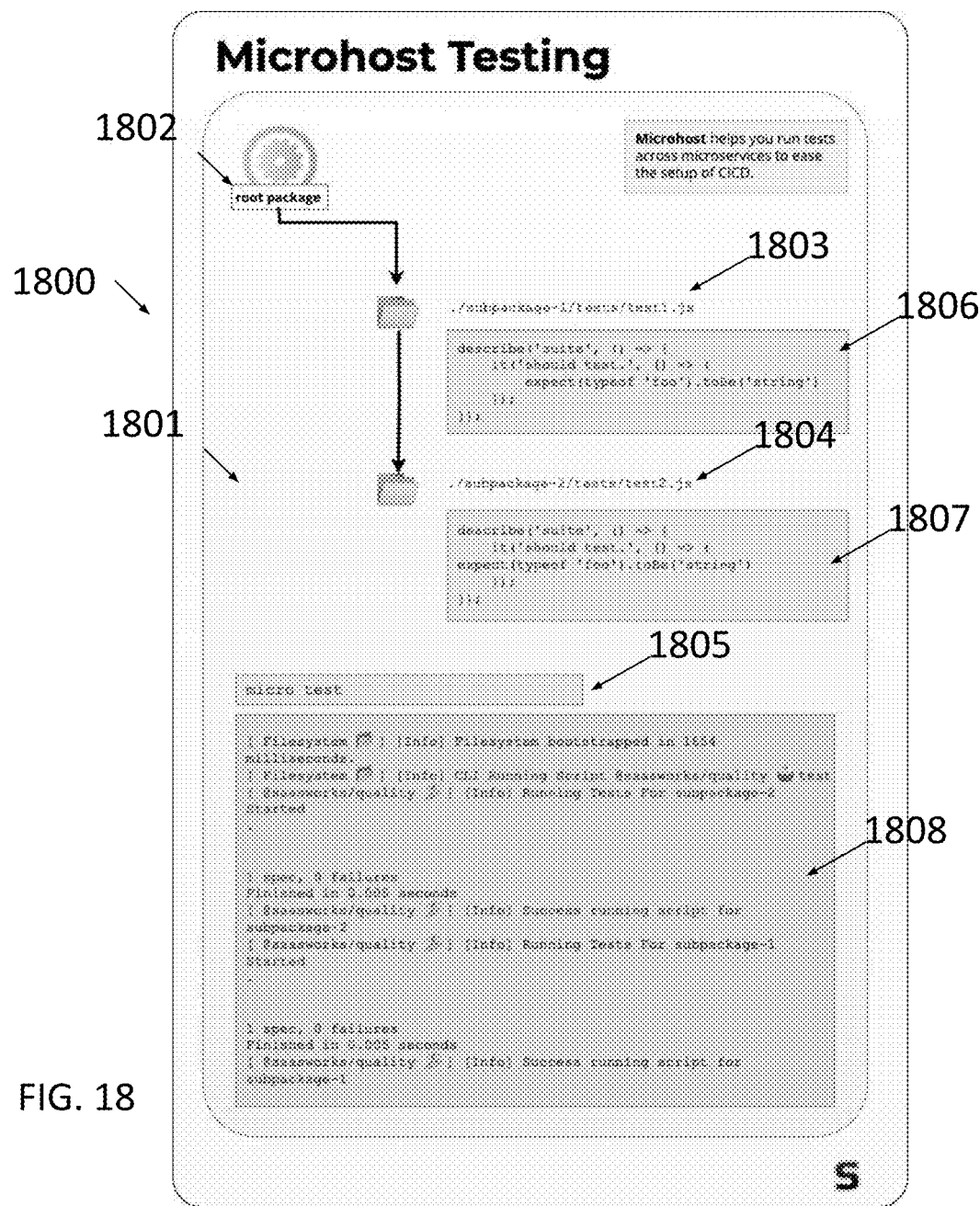
FIG. 18 shows a diagram depicting how file queries of ambiguously known files can identify tests across discovered microservices, according to some embodiments described herein.

FIG. 18 shows an example embodiment diagram 1800, demonstrating how file queries of ambiguously known files can identify tests across discovered microservices. These scripts can then be conveniently executed (see FIG. 8C for an underlying pattern). Filesystem 1801 can contain a root package 1802 and a discovered local package "subpackage-1" implied by file 1803; and a discovered local package "subpackage-2" implied by file 1804. The files can be formatted in 1806 and 1807 to be compatible with a test runner like Jasmine or Jest so that when a user executes the command 1805, the tests for the discovered local microservice packages are run in the test runner. This is helpful because without using file queries or package discovery, a user will need to change directory into the directory where they want to run a test suite. If a user needs to orchestrate tests as part of some CICD toolchain, the user may need to author or select a pre-authored script to run tests across packages which may rely on fixed or pre-determined filesystem paths which deteriorates development flexibility. Both 1806 and 1807 files specify some execution code that when 1805 is run displays the output from those files' execution code in 1708.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A computer-implemented method, comprising:
   instructions, stored in non-transitory computer readable memory, that, when executed by a processor, cause the processor to perform the steps of:
   creating a cache of discovered directories in a filesystem stored on a data storage device; and
   using the cache to reduce the time cost of microservice discovery, wherein the cache of discovered directories describes local packages that are semantically constructed as microservices;
   creating a "development mode" where the local packages are discovered at the outset of each execution, and the local packages objects are refreshed only if they have a more recent modification time;
   creating a "production mode" where the local packages are only discovered on a first run, and the local package objects are only read into the cache one time, wherein package manager managed packages are discovered only upon installation and package manager managed package objects are read into a cache only upon installation;
   distinguishing between package manager managed microservice directories and developer managed microservice directories responsive to one or more of storing, querying, loading, and refreshing of the cache;
   providing an application programming interface (API) to enable access to ambiguously known files across microservices on the data storage device, the API providing lookups using wildcard patterns and globstar patterns using an in-memory cache of discovered microservice directories; and
   providing an application programming interface (API) to enable access to a list of ambiguously known file names across microservices on the data storage device, the API to display the list in a priority order via a user interface that is useful in enabling developers to meaningfully organize one microservice to specify defaults and another microservice override those defaults.

2. The computer-implemented method of claim 1, wherein the API is further enabled to load files across disparate data storage devices, filesystem trees, and filesystem trees of networked computers by way of an interface within the package object to declare its files as shared or allowing a package to be specified as shared, and
    wherein shared package paths are stored in a centrally known cache location so that the central cache can be read and known to contain information about microservices on the computers filesystem.

3. The computer-implemented method of claim 2, wherein the instructions further comprise:
    performing lookups with the API within shared package paths.

4. The computer-implemented method of claim 3, wherein the instructions further comprise:
    allowing the lookups to be triggered by a remote computer.

5. The computer-implemented method of claim 4, wherein the instructions further comprise:
    allowing the results of filesystem lookups to be made available to a remote computer.

6. The computer-implemented method of claim 1, wherein the instructions further comprise:
    providing an application programming interface (API) to enable loading of JSON files ambiguously known across microservices on the data storage device and to enable merging of the JSON files together in a priority order,
    wherein the usage of merging for the purposes of simply devising meaningful data objects for a microservice and meaningful configurations for a microservice by enabling a microservice to specify only the minimum configuration it needs to override other microservice defaults and configurations.

7. The computer-implemented method of claim 1, wherein the instructions further comprise:
    executing lookup APIs to serve a queried set of ambiguously known files comprising file content across discovered microservices over a web server,
    wherein the lookup APIs are used to assemble a payload composed of the ambiguously known files scanned across microservices so that the payload is sent as one bundled file instead of requiring each file to be requested or specified for bundling.

8. The computer-implemented method of claim 1, wherein the instructions further comprise:
    consolidating dependencies across discovered microservices within a root path so that the package manager installation can be performed only once and the downloaded and installed dependencies can be reused across all of the discovered microservices in such a way that every microservice has the dependencies it needs and so that installation is performed only one time.

9. The computer-implemented method of claim 1, wherein the instructions further comprise:
    using lookup API's to run ambiguously known script files and jobs specified by each microservice without having to direct a terminal session have a current working directory in the microservice directory where the script would otherwise require a terminal session to have a current working directory in the microservice directory,
    wherein lookup API's are used to retrieve ambiguously known test files to run automated tests for a microservice without having to direct an automated test suite to execute from the microservice directory.

* * * * *